US007705986B2

(12) United States Patent
Yamanaka et al.

(10) Patent No.: US 7,705,986 B2
(45) Date of Patent: Apr. 27, 2010

(54) SENSOR UNIT AND IMAGE DISPLAY APPARATUS

(75) Inventors: Kazuya Yamanaka, Hachioji (JP); Susumu Kobayashi, Sayama (JP); Kensuke Ishii, Tokyo (JP)

(73) Assignee: Olympus Corporation, Tokyo (JP)

( * ) Notice: Subject to any disclaimer, the term of this patent is extended or adjusted under 35 U.S.C. 154(b) by 529 days.

(21) Appl. No.: 11/804,768

(22) Filed: May 18, 2007

(65) Prior Publication Data

US 2007/0216440 A1 Sep. 20, 2007

Related U.S. Application Data

(63) Continuation of application No. PCT/JP2005/021163, filed on Nov. 17, 2005.

(30) Foreign Application Priority Data

Nov. 18, 2004 (JP) ............................ 2004-334736
Jul. 11, 2005 (JP) ............................ 2005-202000

(51) Int. Cl.
*G01J 4/00* (2006.01)

(52) U.S. Cl. ....................... 356/368; 356/364; 356/365; 356/366; 356/367; 356/370

(58) Field of Classification Search ....................... None
See application file for complete search history.

(56) References Cited

U.S. PATENT DOCUMENTS 4,272,195 A * 6/1981 Kaye .......................... 356/368
5,434,671 A * 7/1995 Sumiyoshi et al. .......... 356/367
5,532,823 A * 7/1996 Fukui et al. ................. 356/364
5,999,240 A * 12/1999 Sharp et al. ................. 356/368
6,081,337 A * 6/2000 Kwok et al. ................ 356/365
2002/0024667 A1* 2/2002 Hirosawa .................... 356/364
2006/0215159 A1* 9/2006 Smith ......................... 356/367

FOREIGN PATENT DOCUMENTS

JP 4-44625 4/1992
JP 4-307312 10/1992
JP 6-186932 7/1994
JP 8-54859 2/1996
JP 10-161082 6/1998
JP 11-296135 10/1999
JP 11-3326877 11/1999
JP 2000-28994 1/2000
JP 2000-338916 12/2000
JP 2003-302617 A 10/2003
JP 2004-180011 6/2004

* cited by examiner

*Primary Examiner*—Gregory J Toatley, Jr.
*Assistant Examiner*—Juan D Valentin
(74) *Attorney, Agent, or Firm*—Volpe and Koenig P.C.

(57) ABSTRACT

A sensor unit for measuring a response characteristic of a polarization rotation liquid crystal cell, includes a measurement light source which emits measurement light, a first polarization plate which has a first polarization direction and receives the measurement light from the measurement light source to output measurement light having the first polarization direction to a polarization rotation liquid crystal cell, a second polarization plate which has a second polarization direction and receives measurement light passed through the polarization rotation liquid crystal cell, a light receiving unit which receives measurement light passed through the second polarization plate, and a measurement unit which determines a response characteristic of the polarization rotation liquid crystal cell on the basis of a drive signal of the polarization rotation liquid crystal cell and the amount of measurement light received by the light receiving unit.

16 Claims, 22 Drawing Sheets

SENSOR UNIT AND IMAGE DISPLAY APPARATUS

CROSS-REFERENCE TO RELATED APPLICATIONS

This is a Continuation Application of PCT Application No. PCT/JP2005/021163, filed Nov. 17, 2005, which was published under PCT Article 21(2) in Japanese.

This application is based upon and claims the benefit of priority from prior Japanese Patent Applications No. 2004-334736, filed Nov. 18, 2004; and No. 2005-202000, filed Jul. 11, 2005, the entire contents of both of which are incorporated herein by reference.

BACKGROUND OF THE INVENTION

1. Field of the Invention

The present invention relates to a sensor unit and an image display apparatus having the sensor unit.

2. Description of the Related Art

As a technique to provide a high-resolution image projection apparatus using a display device, such as an LCD, having a limited number of pixels, a wobbling technique is known which uses a polarization rotation liquid crystal cell and a birefringent plate in combination to perform pixel shifts.

With the wobbling technique, the timing of shifting light is dependent upon on and off of the polarization rotation liquid crystal cell. For this reason, to provide good display, it is important to drive control the polarization rotation liquid crystal cell taking its response into consideration. For example, JP-A No. 11-296135 (KOKAI) discloses a technique to determine an ideal drive signal of the polarization rotation liquid crystal cell. The response characteristic of the polarization rotation liquid crystal cell is temperature dependent. Thus, in order to apply an ideal drive signal to the liquid crystal cell even with temperature changed, a method has also been proposed by which the drive signal is changed on the basis of temperature information from a temperature sensor (see JP-A No. 11-326877 (KOKAI)).

With the proposal described in JP-A No. 11-326877, however, the temperature of the polarization rotation liquid crystal cell is measured; therefore, its response characteristic cannot be obtained. For this reason, it is required to determine the temperature versus response characteristic relationship of the polarization rotation liquid crystal cell in advance. However, it is not practical in terms of time and cost to determine in advance the temperature versus response characteristic relationship for all the polarization rotation liquid crystal cells actually manufactured. One might suggest a method to determine the temperature versus response characteristic relationship of a reference polarization rotation liquid crystal cell in advance. However, an ideal drive signal could not be obtained because the characteristic of the reference polarization rotation liquid crystal cell is not identical to those of polarization rotation liquid crystal cells actually manufactured.

JP-A No. 2000-284255 (KOKAI) discloses a method to calculate the temperature of a display liquid crystal panel from its response speed. However, this proposal does not relate to a polarization rotation liquid crystal cell for wobbling but relates to only a liquid crystal cell for display. In addition, to measure the temperature of the liquid crystal panel, its response speed is merely measured.

As described above, the wobbling technique is known as a technique to obtain a high-resolution image projector. Heretofore, it has been difficult to provide ideal driving of a polarization rotation liquid crystal cell taking its response characteristic into consideration.

The object of the present invention is to provide a sensor unit and an image display apparatus which allow the response characteristic of a polarization rotation liquid crystal cell to be obtained exactly.

BRIEF SUMMARY OF THE INVENTION

A first aspect of the present invention, there is provided a sensor unit for measuring a response characteristic of a polarization rotation liquid crystal cell, comprising: a measurement light source which emits measurement light; a first polarization plate which has a first polarization direction and receives the measurement light from the measurement light source to output measurement light having the first polarization direction to a polarization rotation liquid crystal cell; a second polarization plate which has a second polarization direction and receives measurement light passed through the polarization rotation liquid crystal cell; a light receiving unit which receives measurement light passed through the second polarization plate; and a measurement unit which determines a response characteristic of the polarization rotation liquid crystal cell on the basis of a drive signal of the polarization rotation liquid crystal cell and the amount of measurement light received by the light receiving unit.

In the sensor unit, the first and second polarization directions are the same or perpendicular to each other.

In the sensor unit, the measurement light source is an LED which emits measurement light of green.

In the sensor unit, the LED has a condenser element.

In the sensor unit, the light receiving unit includes a photodiode.

A second aspect of the present invention, there is provided an image display apparatus which presents an image to an observer, comprising: an image modulation unit which produces modulated light modulated according to an image signal; a polarization rotation liquid crystal cell which is capable of rotating a direction of polarization of the modulated light produced by the image modulation unit; a birefringent plate which receives the modulated light from the polarization rotation liquid crystal cell; a display optical unit which presents the modulated light from the birefringent plate to the observer; a sensor unit configured to measure a response characteristic of the polarization rotation liquid crystal cell, the sensor unit including a measurement light source which emits measurement light, a first polarization plate which has a first polarization direction and receives the measurement light from the measurement light source to output measurement light having the first polarization direction to the polarization rotation liquid crystal cell, a second polarization plate which has a second polarization direction and receives measurement light passed through the polarization rotation liquid crystal cell, a light receiving unit which receives measurement light passed through the second polarization plate, and a measurement unit which determines a response characteristic of the polarization rotation liquid crystal cell on the basis of a drive signal of the polarization rotation liquid crystal cell and the amount of measurement light received by the light receiving unit; and a liquid crystal cell drive unit which drives the polarization rotation liquid crystal cell by a drive signal adjusted on the basis of the response characteristic determined by the measurement unit.

In the image display apparatus, the drive signal is adjusted taking into consideration the amount of light received by the light receiving unit when the polarization rotation liquid crystal cell has been set to a rotating state and the amount of light received by the light receiving unit when the polarization rotation liquid crystal cell has been set to a non-rotating state.

In the image display apparatus, the drive signal is adjusted so that the ratio or difference between a first amount of light received by the light receiving unit when the polarization rotation liquid crystal cell has been set to the rotating state and a second amount of light received by the light receiving unit when the polarization rotation liquid crystal cell has been set to the non-rotating state increases.

In the image display apparatus, the modulated light that the birefringent plate receives is separated into available light which arrives a target pixel and unavailable light which arrives a pixel next to the target pixel, and the drive signal is adjusted so that the ratio or difference between the amount of available light and the amount of unavailable light increases.

In the image display apparatus, an angle between a line that connects a center of the measurement light source and a center of the light receiving unit and a line normal to a light receiving surface of the polarization rotation liquid crystal cell is not more than 5 degrees.

In the image display apparatus, the sensor unit is placed in an area outside an area through which the modulated light from the image modulation unit passes.

In the image display apparatus, the image modulation unit is placed on the light receiving unit side of the polarization rotation liquid crystal cell.

In the image display apparatus, the drive signal is adjusted in real time.

In the image display apparatus, the measurement unit determines the response characteristic a plurality of times, and the drive signal is adjusted on the basis of a plurality of response characteristics determined.

In the image display apparatus, the drive signal is adjusted during a blanking period of the image signal.

A third aspect of the present invention, there is provided an image display apparatus which presents an image to an observer, comprising: an image modulation unit which produces modulated light modulated according to an image signal; a first polarization rotation liquid crystal cell which is capable of rotating a direction of polarization of the modulated light produced by the image modulation unit; a first birefringent plate which receives the modulated light from the first polarization rotation liquid crystal cell; a second polarization rotation liquid crystal cell which is capable of rotating a direction of polarization of the modulated light output from the first birefringent plate; a second birefringent plate which receives the modulated light from the second polarization rotation liquid crystal cell; a display optical unit which presents the modulated light from the second birefringent plate to the observer; a sensor unit configured to measure response characteristics of the first and second polarization rotation liquid crystal cells, the sensor unit including a measurement light source which emits measurement light, a first polarization plate which has a first polarization direction and receives the measurement light from the measurement light source to output measurement light having the first polarization direction to the first polarization rotation liquid crystal cell, a second polarization plate which has a second polarization direction and receives measurement light passed through the second polarization rotation liquid crystal cell, a light receiving unit which receives measurement light passed through the second polarization plate, and a measurement unit which determines response characteristics of the first and second polarization rotation liquid crystal cells on the basis of drive signals of the first and second polarization rotation liquid crystal cells and the amount of measurement light received by the light receiving unit; and a liquid crystal cell drive unit which drives the first and second polarization rotation liquid crystal cells by drive signals adjusted on the basis of the response characteristics determined by the measurement unit.

In the image display apparatus, the liquid crystal cell drive unit drives the first and second polarization rotation liquid crystal cells so that a transition timing of the drive signal of the first polarization rotation liquid crystal cell and a transition timing of the drive signal of the second polarization rotation liquid crystal cell are not coincident with each other.

In the image display apparatus, the polarization rotation liquid crystal cell has a display area through which the modulated light modulated by the image modulation unit passes and a measurement area through which the measurement light passes, and the liquid crystal cell drive unit drives each of the display area and the measurement area separately.

In the image display apparatus, the polarization rotation liquid crystal cell has a display area through which the modulated light modulated by the image modulation unit passes and a measurement area through which the measurement light passes, and further comprising a light-tight member between the display area and the measurement area to optically isolate the modulated light and the measurement light.

A fourth aspect of the present invention, there is provided an image display apparatus which presents an image to an observer, comprising: an image modulation unit which produces modulated light modulated according to an image signal; a first polarization rotation liquid crystal cell which is capable of rotating a direction of polarization of the modulated light produced by the image modulation unit; a first birefringent plate which receives the modulated light from the first polarization rotation liquid crystal cell; a second polarization rotation liquid crystal cell which is capable of rotating a direction of polarization of the modulated light output from the first birefringent plate; a second birefringent plate which receives the modulated light from the second polarization rotation liquid crystal cell; a display optical unit which presents the modulated light from the second birefringent plate to the observer; a sensor unit configured to measure a response characteristic of the first polarization rotation liquid crystal cell, the sensor unit including a measurement light source which emits measurement light, a first polarization plate which has a first polarization direction and receives the measurement light from the measurement light source to output measurement light having the first polarization direction to the first polarization rotation liquid crystal cell, a second polarization plate which has a second polarization direction and receives measurement light passed through the second polarization rotation liquid crystal cell, a light receiving unit which receives measurement light passed through the second polarization plate, and a measurement unit which determines a response characteristic of the first polarization rotation liquid crystal cell on the basis of a drive signal of the first polarization rotation liquid crystal cell and the amount of measurement light received by the light receiving unit; and a liquid crystal cell drive unit which drives the first polarization rotation liquid crystal cell by a drive signal adjusted on the basis of the response characteristic determined by the measurement unit and drives the second polarization rotation liquid crystal cell by a drive signal adjusted on the basis of a response characteristic estimated from the response characteristic determined by the measurement unit.

A fifth aspect of the present invention, there is provided an image display apparatus which presents an image to an observer, comprising: an image modulation unit which produces modulated light modulated according to an image signal; a first polarization rotation liquid crystal cell which is capable of rotating a direction of polarization of the modulated light produced by the image modulation unit; a first birefringent plate which receives the modulated light from the first polarization rotation liquid crystal cell; a second polarization rotation liquid crystal cell which is capable of rotating a direction of polarization of the modulated light output from the first birefringent plate; a second birefringent plate which receives the modulated light from the second polarization rotation liquid crystal cell; a display optical unit which presents the modulated light from the second birefringent plate to the observer; a sensor unit configured to measure a response characteristic of the second polarization rotation liquid crystal cell, the sensor unit including a measurement light source which emits measurement light, a first polarization plate which has a first polarization direction and receives the measurement light from the measurement light source to output measurement light having the first polarization direction to the first polarization rotation liquid crystal cell, a second polarization plate which has a second polarization direction and receives measurement light passed through the second polarization rotation liquid crystal cell, a light receiving unit which receives measurement light passed through the second polarization plate, and a measurement unit which determines a response characteristic of the second polarization rotation liquid crystal cell on the basis of a drive signal of the second polarization rotation liquid crystal cell and the amount of measurement light received by the light receiving unit; and a liquid crystal cell drive unit which drives the second polarization rotation liquid crystal cell by a drive signal adjusted on the basis of the response characteristic determined by the measurement unit and drives the first polarization rotation liquid crystal cell by a drive signal adjusted on the basis of a response characteristic estimated from the response characteristic determined by the measurement unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The embodiments of the present invention will be described hereinafter with reference to the accompanying drawings.

First Embodiment

Figure 1:
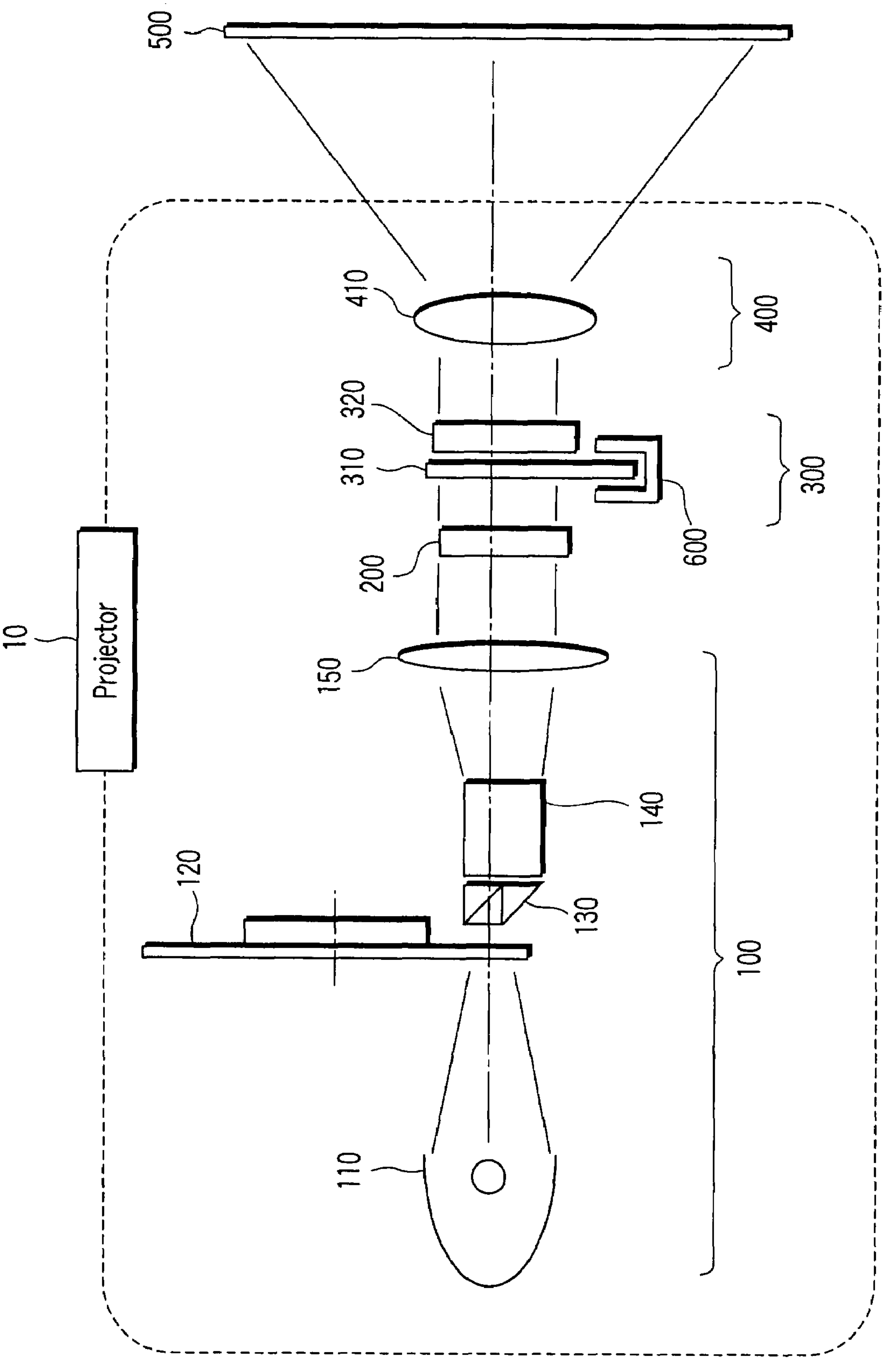
FIG. 1 shows the basic configuration of an image display apparatus having a sensor unit according to a first embodiment of the present invention.

FIG. 1 shows the basic configuration of an image display apparatus having a sensor unit according to a first embodiment of the present invention. The embodiment will be described in terms of an image projection apparatus (projector) which is an example of an image display apparatus.

The projector 10 is equipped with an illumination unit 100, a display unit 200, a pixel shift unit 300, and a display optical unit 400. Image light emerging from the projector 10 is projected onto a screen 500 to present an image to an observer. In addition, the projector 10 is equipped with a sensor unit 600 in association with the pixel shift unit 300.

The illumination unit 100 is equipped with a light source 110 for display, a color wheel 120, a PS conversion device 130, an integrator rod 140, and an illumination optical system 150.

The display light source 110 is composed of a discharge lamp light source, such as an extra-high pressure mercury lamp, a metal halide lamp, or a xenon lamp, which produces white light and an elliptic reflector for concentrating the light from the discharge lamp. As the display light source 110 use may be made of an LED or a halogen lamp besides the discharge lamp. Illumination light from the display light source 110 is applied to the color wheel 120. The color wheel 120 has color filters of R (red), G (green), and B (blue) arranged in the circumferential direction. By rotating the color wheel 120, R light, G light and B light are output on a time-division basis from the color wheel 120. The illumination light from the color wheel 120 is applied via the PD conversion device 130 to the integrator rod 140. Setting the PS conversion device 130 allows the illumination light to be oriented efficiently in a specific direction of polarization. Setting the integrator rod 140 allows unevenness of illumination to be reduced. The illumination light from the integrator rod 140 is applied via the illumination optical system 150 to the display unit 200.

The display unit (image modulation unit) 200 modulates the illumination light with an input video signal (input image signal) to produce modulated light. Specifically, R, G and B images are displayed on the display unit 200 in synchronization with emergence of R, G and B light from the color wheel 120. Thereby, R modulated light, G modulated light and B modulated light are output from the display unit 200 and then combined in the time-axis direction. The display unit (image modulation unit) 200 is comprised of a transmissive LCD. The direction of polarization of illumination light by the PS conversion device 130 of the illumination unit 100 and the axis of polarized light transmission of the transmissive LCD are made to align in the same direction.

The illumination light modulated by the display unit 200 is applied to the pixel shift unit (wobbling unit) 300. The pixel shift unit 300 is constructed from a polarization rotation liquid crystal cell 310 and a birefringent plate 320. Its basic structure is the same as that disclosed in JP-A No. 11-296135 (KOKAI) or JP-A No. 11-326877 (KOKAI). In addition, the sensor unit 600 is set so that the polarization rotation liquid crystal cell 310 is inserted into it. The pixel shift unit 300 and the sensor unit 600 will be described in detail later.

The illumination light passed through the pixel shift unit 300 is applied to the screen 500 through the projection optical system 410 of the display optical unit 400. A conjugate image of the display unit 200 is projected with enlargement onto the screen 500.

Figure 2A:
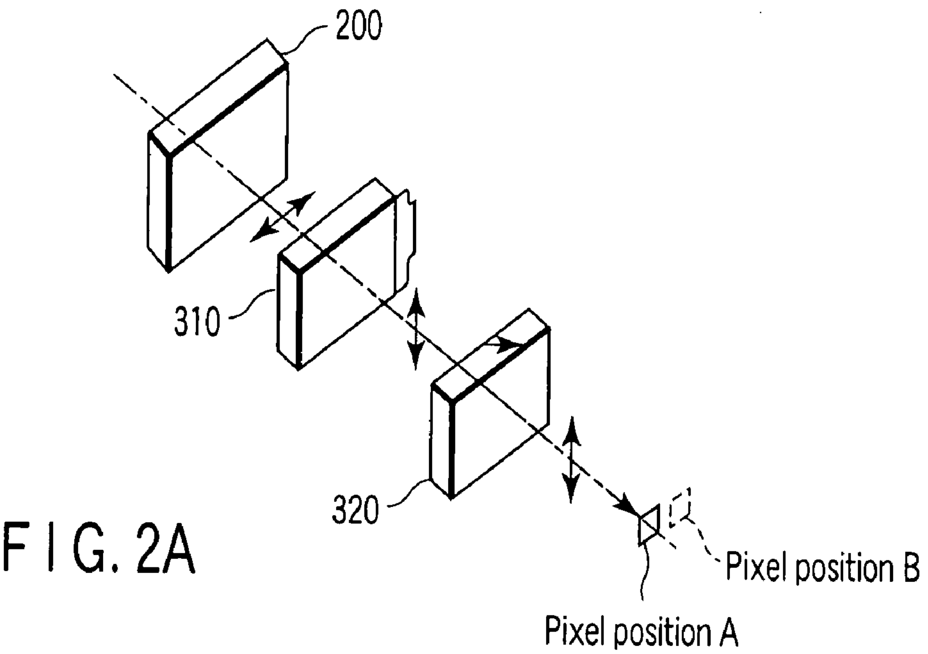
FIG. 2A shows the principle of the pixel shift operation of the pixel shift unit according to the first embodiment of the present invention.
Figure 2B:
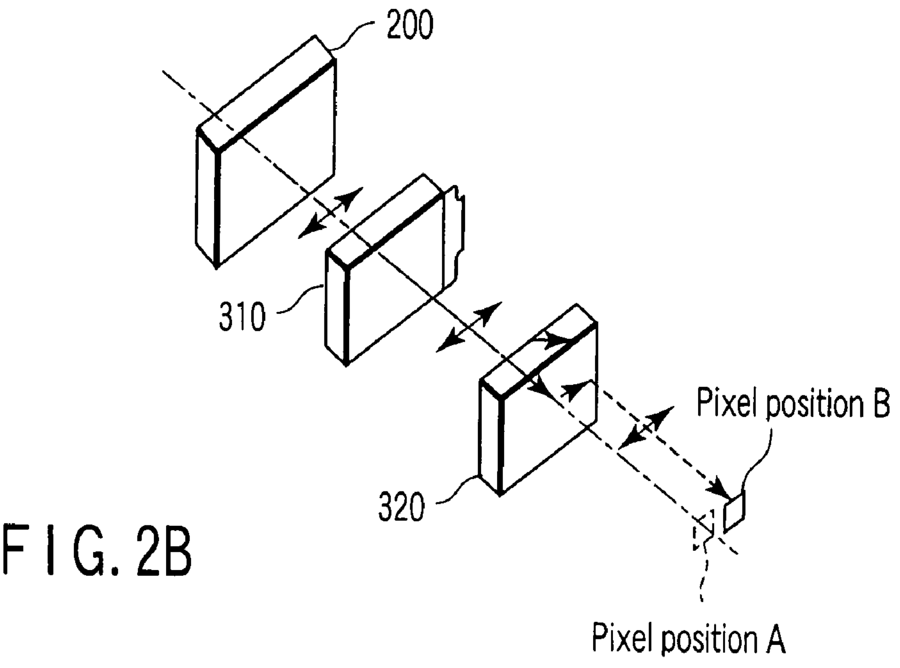
FIG. 2B shows the principle of the pixel shift operation of the pixel shift unit according to the first embodiment of the present invention.

FIGS. 2A and 2B illustrate the principle of the pixel shift operation of the pixel shift unit 300.

FIG. 2A shows the operation when an off voltage is applied to the polarization rotation liquid crystal cell 310 and FIG. 2B shows the operation when an on voltage is applied to the polarization rotation liquid crystal cell 310.

Reference is first made to FIG. 2A to describe the operation when an off voltage is applied to the polarization rotation liquid crystal cell 310. Polarized light having a polarized-light transmission axis in the horizontal direction is output from the display unit 200 as image light (modulated light). Since the off voltage is being applied to the polarization rotation liquid crystal cell 310, the polarized light having the polarized-light transmission axis in the horizontal direction is rotated through 90 degrees and consequently polarized light having a polarized-light transmission axis in the vertical direction is output from the polarization rotation liquid crystal cell 310. The polarized light output from the polarization rotation liquid crystal cell 310 passes through the birefringent plate 320 as ordinary light without being shifted. As a result, a beam of image light will arrive at pixel position A on the screen 500.

Reference is next made to FIG. 2B to describe the operation when an on voltage is applied to the polarization rotation liquid crystal cell 310. Polarized light having the polarized-light transmission axis in the horizontal direction is output from the display unit 200 as image light (modulated light). Since the on voltage is being applied to the polarization rotation liquid crystal cell 310, the polarized light having the polarized-light transmission axis in the horizontal axis passes through the polarization rotation liquid crystal cell 310 without being rotated. The polarized light emerging from the polarization rotation liquid crystal cell 310 is shifted in the horizontal direction as extraordinary light in the birefringent plate 320 and then passes through it. As a result, a beam of image light will arrive at pixel position B on the screen 500.

As can be seen from the foregoing, whether to perform the shift operation in the birefringent plate 320 or not can be controlled by switching the polarization rotation liquid crystal cell 310 on or off. Therefore, by switching the polarization rotation liquid crystal cell 310 on and off in time sequence synchronously with the timing of modulation of the display unit 200, the display state of FIG. 2A and the display state of FIG. 2B can be combined in the direction of time axis. As a result, it becomes possible to display an image which has twice as many pixels as the display unit 200 on the screen 500.

Figure 3:
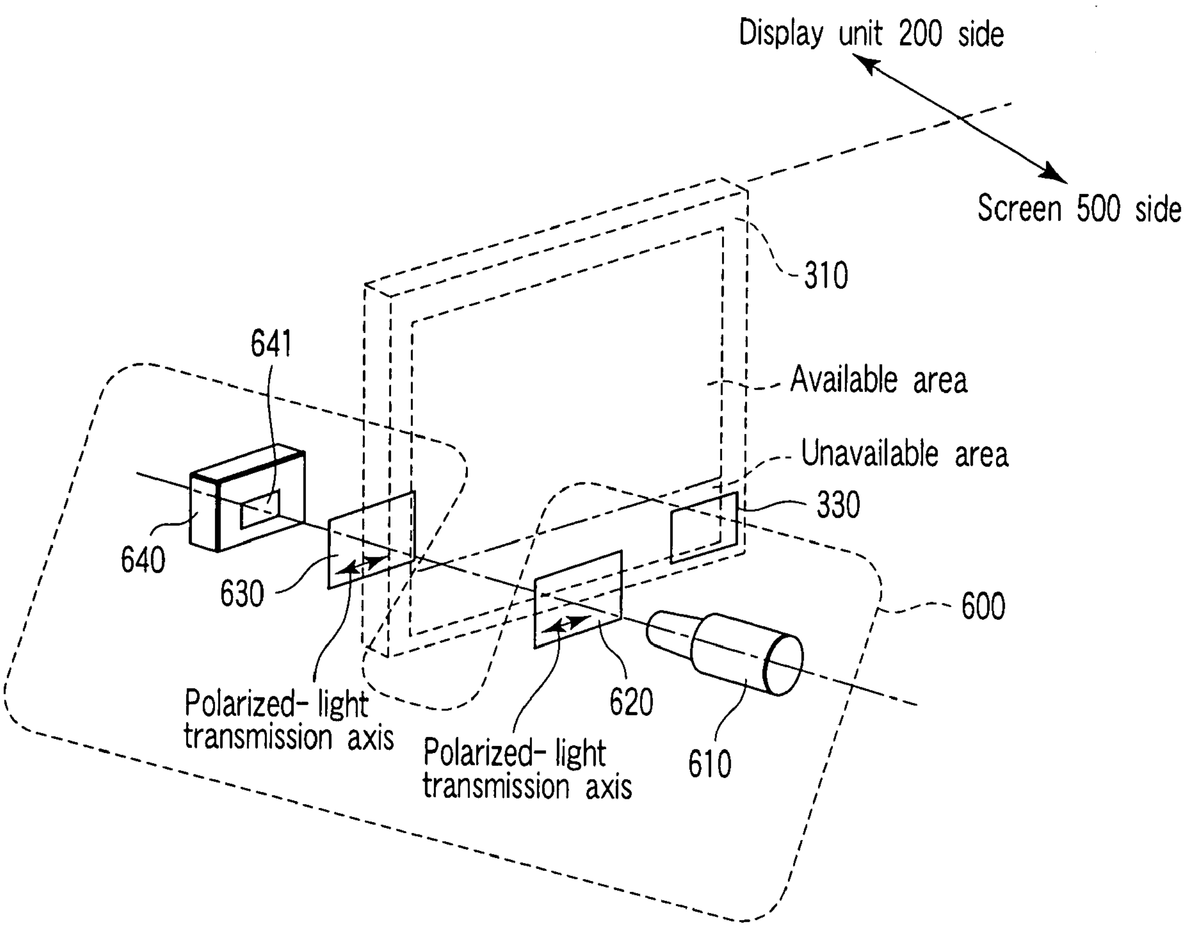
FIG. 3 shows the configuration of the sensor unit according to the first embodiment of the present invention.

FIG. 3 shows the configuration of the sensor unit 600 shown in FIG. 1.

The sensor unit 600 is equipped with a light source 610 for measurement, polarizing plates 620 and 630, and a light receiving device 640. The measurement light from the measurement light source 610 falls on the light receiving device 640 through the polarizing plate 620, the polarization rotation liquid crystal cell 310, and the polarizing plate 630. The response characteristic of the polarization rotation liquid crystal cell 310 can be measured by the sensor unit 600.

The measurement light source 610 is comprised of an LED and has a condenser lens to prevent the diffusion of light of the LED. In measuring the response characteristic of the polarization rotation liquid crystal cell 310 by the sensor unit 600, the measurement light source 610 emits light at all times. The measurement light from the measurement light source 610 is polarized in one direction by the polarizing plate 620 and then applied to the polarization rotation liquid crystal cell 310. The polarizing plate 630 is set to face the polarizing plate 620 with the polarization rotation liquid crystal cell 310 interposed therebetween. The polarizing plates 620 and 630 are placed so that their polarized-light transmission axes are aligned in the same direction. The measurement light passed through the polarizing plate 630 is directed to a light receiving area 641 of the light receiving device 640 which is comprised of a photodiode. The light receiving device 640 outputs a photoelectric conversion signal corresponding to the amount of received measurement light.

Figure 4A:
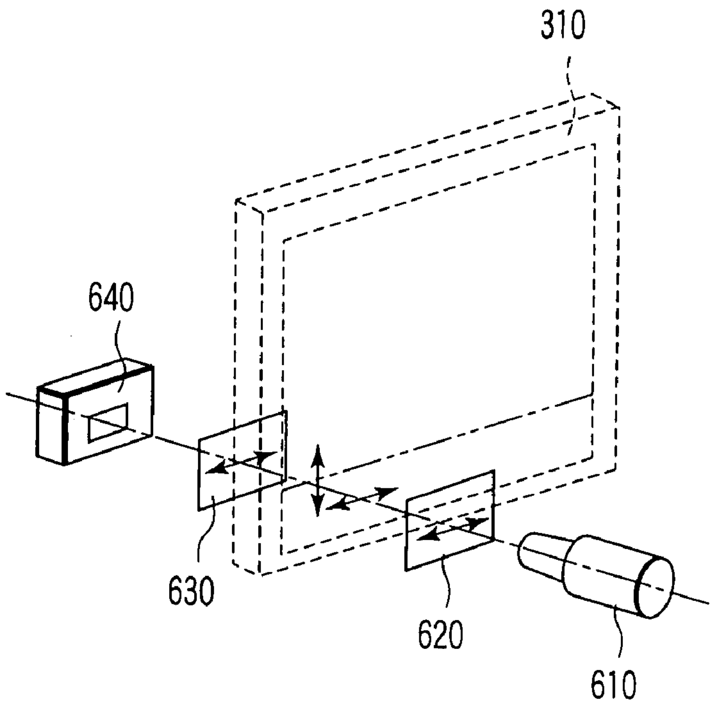
FIG. 4A is a diagram for use in explanation of the operation of the sensor unit according to the first embodiment of the present invention.
Figure 4B:
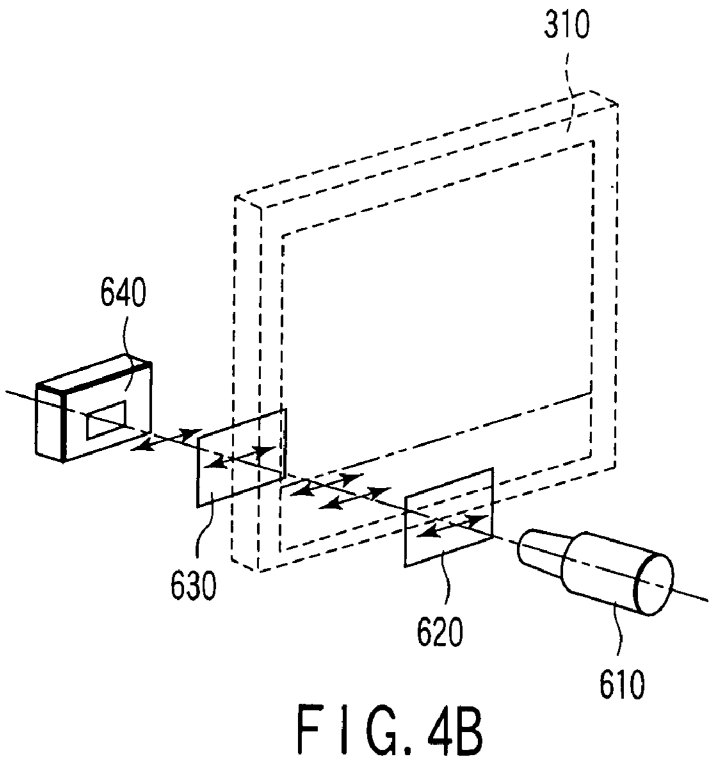
FIG. 4B is a diagram for use in explanation of the operation of the sensor unit according to the first embodiment of the present invention.

FIGS. 4A and 4B are diagrams for use in explanation of the operation of the sensor unit 600. FIG. 4A shows the operation when the off voltage is applied to the polarization rotation liquid crystal cell 310 and FIG. 4B shows the operation when the on voltage is applied to the polarization rotation liquid crystal cell 310.

Reference is first made to FIG. 4A to describe the operation when the off voltage is applied to the polarization rotation liquid crystal cell 310. The measurement light from the measurement light source 610 is converted by the polarizing plate 620 to polarized light having the horizontal axis of polarized-light transmission and then directed to the polarization rotation liquid crystal cell 310. Since the off voltage is applied to the polarization rotation liquid crystal cell 310, the polarized light incident on it is rotated through 90 degrees and, as a result, vertically polarized light is output from the polarization rotation liquid crystal cell 310. The polarized light output from the polarization rotation liquid crystal cell 310 is then directed to the polarizing plate 630. However, the polarizing plate 630, having the horizontal axis of polarized-light transmission, will not transmit the polarized light. For this reason, the measurement light does not arrive at the light receiving device 640 and the amount of received light is virtually zero.

Reference is next made to FIG. 4B to describe the operation when the on voltage is applied to the polarization rotation liquid crystal cell 310. The measurement light from the measurement light source 610 is converted by the polarizing plate 620 to polarized light having the horizontal polarized-light transmission axis and then directed to the polarization rotation liquid crystal cell 310. Since the on voltage is applied to the polarization rotation liquid crystal cell 310, the polarized light will pass through it without being rotated. The polarized light output from the polarization rotation liquid crystal cell 310, having the horizontal polarized-light transmission axis, will pass through the polarizing plate 630 having the horizontal polarized-light transmission axis. As a result, the measurement light will arrive at the light receiving device 640. However, the polarizing plate 620 causes the amount of measurement light output from the measurement light source 610 to be decreased by a factor of two. Thus, not all the measurement light fall on the light receiving device 640.

During the interval when the polarization rotation liquid crystal cell 310 goes from the off voltage applied state to the on voltage applied state or vice versa, it assumes an intermediate state between the off voltage applied state and the on voltage applied state. Even during this transition interval, therefore, an amount of measurement light which corresponds to the state of the polarization rotation liquid crystal cell 310 will fall on the light receiving device 640.

Thus, the amount of light received by the light receiving device 640 varies according to the state of the polarization rotation liquid crystal cell 310 and a photoelectric conversion signal corresponding to the amount of received light is output from the light receiving device 640.

As can be seen from the foregoing, by setting the sensor unit 600 to measure the amount of light received by the light receiving device 640 through the polarization rotation liquid crystal cell 310, the response characteristic of the polarization rotation liquid crystal cell 310 can be measured directly. It is therefore possible to exactly obtain the response characteristic of the polarization rotation liquid crystal cell 310 even if it varies with temperature.

As shown in FIG. 3, the sensor unit 600 is placed outside the area through which modulated light from the display unit 200 passes. That is, the sensor unit 600 is placed in a unavailable area other than the available area through which projection light (image light) from the display unit 200 passes, which allows the response characteristic of the polarization rotation liquid crystal cell 310 to be measured without affecting the image light. Thus, the response characteristic of the polarization rotation liquid crystal cell 310 can be always obtained in real time even during the image display.

Also, as shown in FIG. 3, the light receiving device 640 and the polarizing plate 630 are placed on the side of the display unit 200 as viewed from the polarization rotation liquid crystal cell 310. The measurement light source 610 and the polarizing plate 620 are placed on the side of the screen 500. Conversely, if the measurement light source 610 were placed on the side of the display unit 200 and the light receiving device 640 were placed on the side of the screen 500, the possibility of incidence of image light from the display unit 200 on the light receiving device 640 might increase, degrading the measurement accuracy. In addition, the measurement light from the measurement light source 610 might fall on the screen 500 as ghost light, degrading the display characteristics. Such an arrangement as in the embodiment allows such problems as described above to be avoided.

It is desirable that the measurement light source 610 use a green (G) LED. The response speed of liquid crystals is wavelength dependent. It is intrinsically desirable to measure the response characteristic over the entire range of wavelengths of the measurement light; in practice, however, it is difficult to make measurements over the entire range of wavelengths. The use of green light which has a wavelength in the neighborhood of the center of visible light and to which human eyes are highly sensitive allows exact measurements to be made.

Such a sensor unit as shown in FIG. 3 may be set for each of R, G and B. As the measurement light source 610 use may be made of a source of while light. The use of a multiwavelength light source will allow the wavelength-dependent response characteristic to be determined. Furthermore, the response characteristic may be determined according to the color of a displayed image; for example, with an image having a large percentage of red, the response characteristic may be determined on the basis of measurements for red.

It is desirable that the polarized-light transmission axis be coincident with that of image light (modulated light) supplied from the display unit 200 and with the rubbing direction of the alignment layer of the polarization rotation liquid crystal cell 310. Furthermore, although it is desirable that the polarized-light transmission axes of the polarizing plates 620 and 630 be aligned in the same direction as described above, they may be perpendicular to each other.

As shown in FIG. 3, the polarization rotation liquid crystal cell 310 may be equipped with a temperature adjustment unit 330, such as a heater, which controls its temperature. For example, the temperature adjustment unit 330 may heat the polarization rotation liquid crystal cell 310, which is slow in response speed at low temperatures, until it comes to have a desired response speed.

Figure 5:
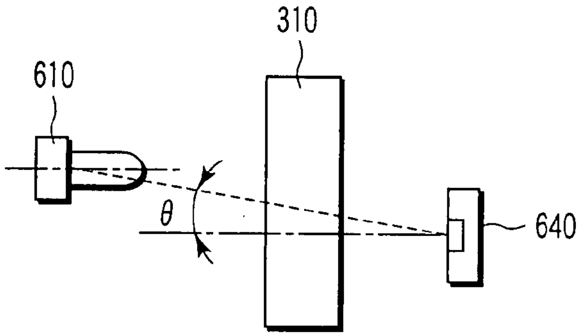
FIG. 5 shows a positional relationship of the measurement light source and the light receiving device with respect to the polarization rotation liquid crystal cell according to the first embodiment of the present invention.

FIG. 5 shows a positional relationship of the measurement light source 610 and the light receiving device 640 with respect to the polarization rotation liquid crystal cell 310. It is desirable that, as shown in FIG. 5, the angle θ between a line that connects the centers of the measurement light source 310 and the light receiving device 640 and a line normal to the plane of incidence of the polarization rotation liquid crystal cell 310 be not more than five degrees. In general, the liquid crystal cell has dependence on viewing angle and the cell characteristic varies according to the angle of transmitted light. Thus, by setting the angle θ to not more than five degrees (0 degrees if possible), the characteristic of the polarization rotation liquid crystal cell 310 can be measured exactly.

Figure 6:
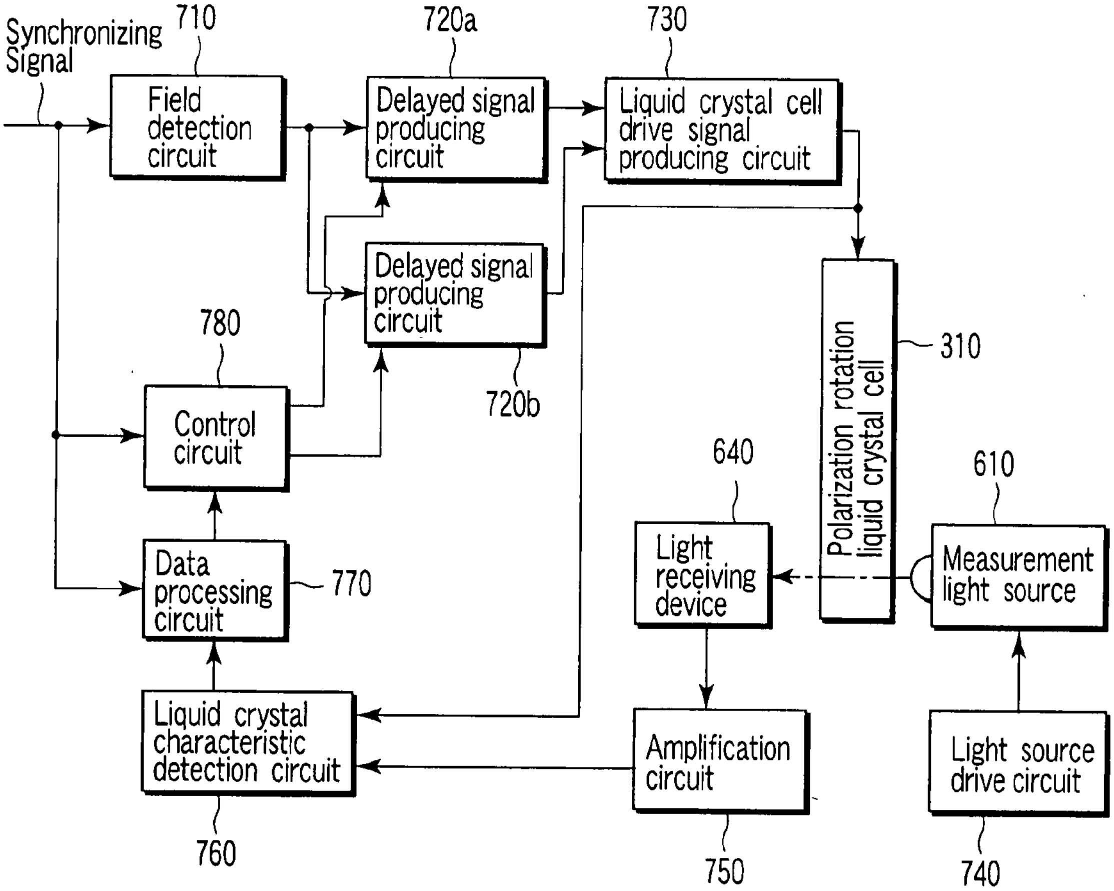
FIG. 6 is a block diagram of the arrangement for drive control of the polarization rotation liquid crystal cell according to the first embodiment of the present invention.

FIG. 6 is a block diagram of the arrangement for drive control of the polarization rotation liquid crystal cell 310.

A field detection circuit 710 receives a predetermined synchronizing signal (for example, a synchronizing signal contained in an image signal (video signal) applied to the display unit 200) to produce a field synchronizing signal. Delayed signal producing circuits **720*a* and 720*b* produce delayed signals on the basis of the field synchronizing signal produced by the field detection circuit 710. Specifically, the delayed signal producing circuit 720*a* produces a delayed signal for determining the timing of the rising edge of a drive signal of the polarization rotation liquid crystal cell 310. The delayed signal producing circuit 720*b* produces a delayed signal for determining the timing of the falling edge of the drive signal. A liquid crystal cell drive signal producing circuit 730 receives the delayed signals from the delayed signal producing circuits 720*a* and 720*b* to produce the drive signal of the polarization rotation liquid crystal cell 310**.

As described previously, by repeating on-off control of the polarization rotation liquid crystal cell 310, the display state of FIG. 2A (let it be the display state A for the sake of convenience) and the display state of FIG. 2B (let it be the display state B for the sake of convenience) are repeated. As a result, an image having twice as many pixels as the display unit 200 can be displayed on the screen 500. In this case, in order to make a proper display, it is required to set the interval of the display state A and the interval of the display state B equal to each other. However, with usual liquid crystal cells, the response time when the applied voltage goes from the on level to the off level (falling response time) is longer than the response time when the applied voltage goes from the off level to the on level (rising response time). For this reason, in order to make the interval of display state A and the interval of display state B equal to each other, it is required to make the on-level interval of the applied voltage shorter than the off-level interval. In this example, the delay time is adjusted by the delayed signal producing circuits **720*a* and 720*b*. This allows the liquid crystal cell drive signal producing circuit 730 to output such a drive signal as makes the interval of display state A and the interval of display state B equal to each other. It therefore becomes possible to drive the polarization rotation liquid crystal cell 310** with an ideal drive signal.

The measurement light source 610 is responsive to a signal from a light source drive circuit 740 to emit measurement light, which in turn is directed to the light receiving device 640 through the polarization rotation liquid crystal cell 310. The light receiving device 640 produces a light detect signal (photoelectric conversion signal) corresponding to the response characteristic (transmission characteristic) of the polarization rotation liquid crystal cell 310. This signal is then amplified by an amplification circuit 750.

The light detect signal amplified by the amplification circuit 750 and the liquid crystal cell drive signal from the liquid crystal cell drive signal producing circuit 730 are applied to a liquid crystal characteristic detection circuit 760, which determines a relationship (temporal relationship) between the liquid crystal cell drive signal and the light detect signal. That is, the liquid crystal characteristic detection circuit 760 functions as measuring means for determining the response characteristic of the polarization rotation liquid crystal cell 310 on the basis of the amount of measurement light received by the light receiving device 640 and the drive signal of the polarization rotation liquid crystal cell 310.

Information obtained by the liquid crystal characteristic detection circuit 760 is sent via a data processing circuit 770 to a control circuit 780, which produces such a control signal as optimizes the liquid crystal cell drive signal on the basis of the information from the liquid crystal characteristic detection circuit 760. The control signal from the control circuit 780 is sent to the delayed signal producing circuits **720*a* and 720*b*, which adjust the delay time of each of the delayed signals on the basis of the control signal. That is, the liquid crystal cell drive signal is adjusted on the basis of the response characteristic of the polarization rotation liquid crystal cell 310 obtained by the liquid crystal characteristic detection circuit 760 and the polarization rotation liquid crystal cell 310** is driven by the adjusted drive signal.

By performing such feedback control at all times, allows the liquid crystal cell drive signal can be adjusted in real time. Therefore, even if the response characteristic of the polarization rotation liquid crystal cell 310 varies with temperature, it can be driven at all times with the optimum drive signal.

Figure 7:
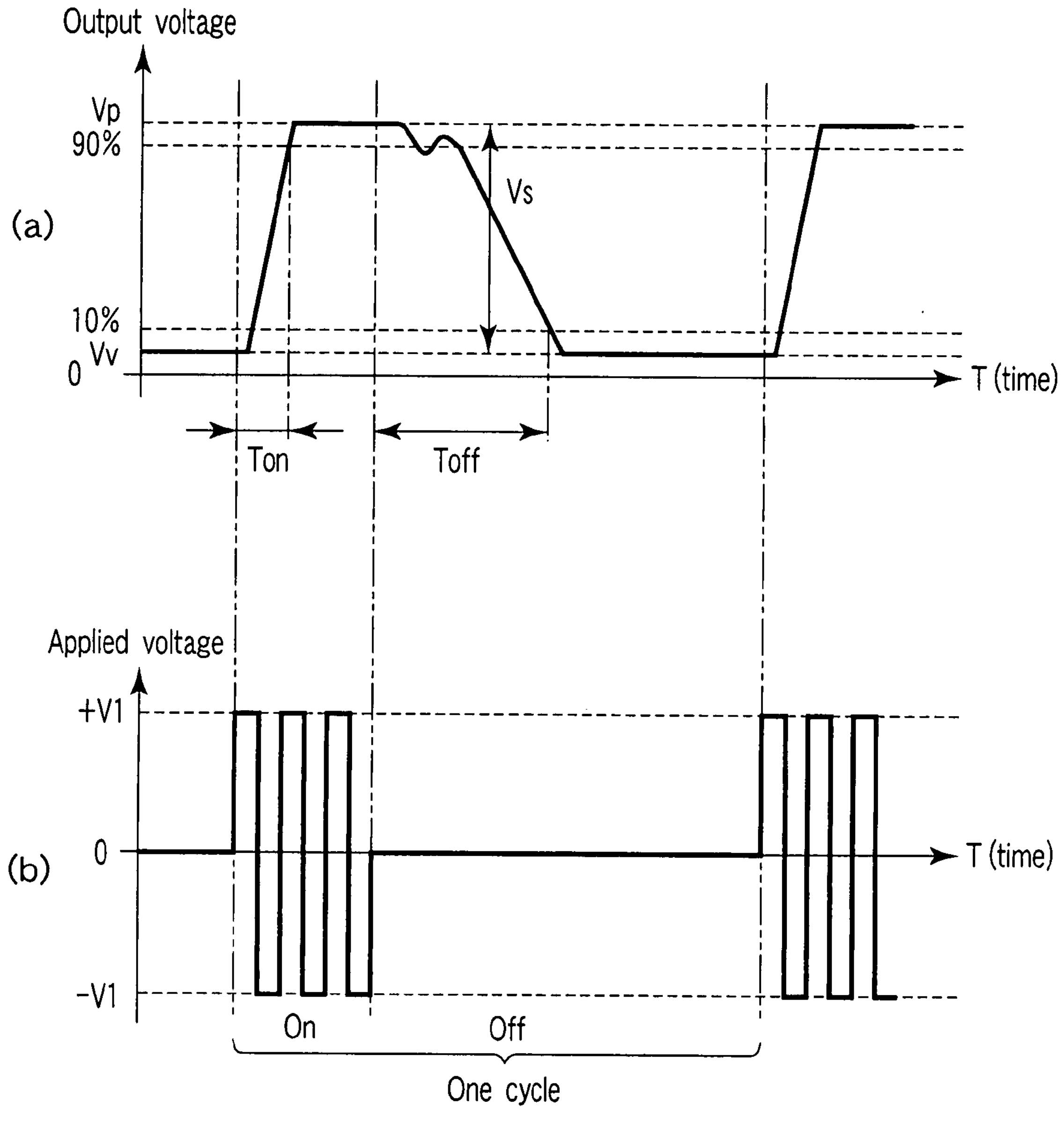
FIG. 7 shows a relationship between the drive signal of the polarization rotation liquid crystal cell and the output voltage of the light receiving device according to the first embodiment of the present invention.

FIG. 7 shows a relationship between the drive signal (b) of the polarization rotation liquid crystal cell 310 and the output voltage (a) of the light receiving device 640. The output voltage waveform of the light receiving device 640 corresponds to the transmission factor, i.e., the response waveform, of the polarization rotation liquid crystal cell 310. The basic matters are the same as those disclosed in JP-A Nos. 11-296135 and 11-326877 (KOKAI).

During the on period of FIG. 7(*b*), an alternating voltage of ±V1 (on voltage) is applied to the polarization rotation liquid crystal cell 310. During the off period, a voltage of zero (off voltage) is applied to the polarization rotation liquid crystal cell 310. Application of the on voltage causes the output voltage of the light receiving device 640 to rise from the minimum value Vv to the maximum value Vp. Application of the off voltage causes the output voltage of the light receiving device 640 to fall from the maximum value Vp to the minimum value Vv. The difference between the maximum value Vp and the minimum value Vv of the output voltage of the light receiving device 640 is taken here to be Vs.

The interval from the time when application of the on voltage to the polarization rotation liquid crystal cell 310 is started until the output voltage of the light receiving device 640 rises to 90% of the maximum value Vp is taken as the rise time Ton. Also, the interval from the time when application of the on voltage to the polarization rotation liquid crystal cell 310 is stopped (application of the off voltage is started) until the output voltage of the light receiving device 640 falls to 10% of the maximum value Vp is taken as the fall time Toff. Determining these rise and fall times Ton and Toff and using these values for the aforementioned feedback control allow a proper liquid crystal cell drive signal to be produced.

In the example shown in FIG. 6, the data processing circuit 770 is provided between the liquid crystal characteristic detection circuit 760 and the control circuit 780. In the aforementioned feedback control, when the liquid crystal cell drive signal is adjusted on the basis of one piece of response characteristic information obtained by the liquid crystal characteristic detection circuit 760, the effect of small variation components may be reflected in the drive signal, adversely affecting optimization of the drive signal. The data processing circuit 770 averages a number of pieces of response characteristic information obtained by the liquid crystal characteristic detection circuit 760 and sends the averaged response characteristic information to the control circuit 780. Thereby, the effect of small variation components is reduced, allowing a proper drive signal to be obtained.

It is desirable to set the interval during which the liquid crystal cell drive signal is to be adjusted to a blanking interval (e.g., the vertical blanking interval) of an image signal (video signal). By adjusting the liquid crystal cell drive signal during the vertical blanking interval by way of example, drive signals can be adjusted without changing drive signals corresponding to one frame (i.e., one frame of image).

According to this embodiment, as described above, the provision of the sensor unit 600 allows the response characteristic of the polarization rotation liquid crystal cell 310 to be obtained directly and exactly even if it varies with temperature. Therefore, by adjusting the drive signal of the polarization rotation liquid crystal cell 310 on the basis of the obtained response characteristic information, it can be driven at all times with the optimum drive signal, allowing the display quality of the image display apparatus to be improved.

Second Embodiment

Next, a second embodiment of the present invention will be described. This embodiment remains unchanged from the first embodiment in the basic configuration of each of the sensor unit and the image display apparatus. Thus, description of the matters described in the first embodiment is omitted here.

In the first embodiment, the direction of polarization (the direction of polarized-light transmission axis) has been assumed to be ideal. However, in practice it is difficult to set the direction of polarization ideal because there are various error factors. For example, error factors include sticking errors of a polarizing plate on the LCD display unit 200, errors in the crystal axis direction of the birefringent plate 320, assembly errors, and errors caused by the applied voltage dependence of the characteristic of the polarization rotation liquid crystal cell 310. In FIGS. 2A and 2B, the direction of polarization is assumed to be ideal. For this reason, in the case of FIG. 2A, a beam of image light (modulated light) arrives at pixel position A alone. In the case of FIG. 2B, a beam of image light arrives at pixel position B alone.

However, in practice there are various error factors as described above. For this reason, modulated light incident on the birefringent plate 320 is output therefrom divided into light (available light) which arrives at a target pixel position (for example, the pixel position A in FIG. 2A) and light (unavailable light) which arrives at a pixel position adjacent to the target pixel position (for example, the pixel position B in FIG. 2A).

Figure 8A:
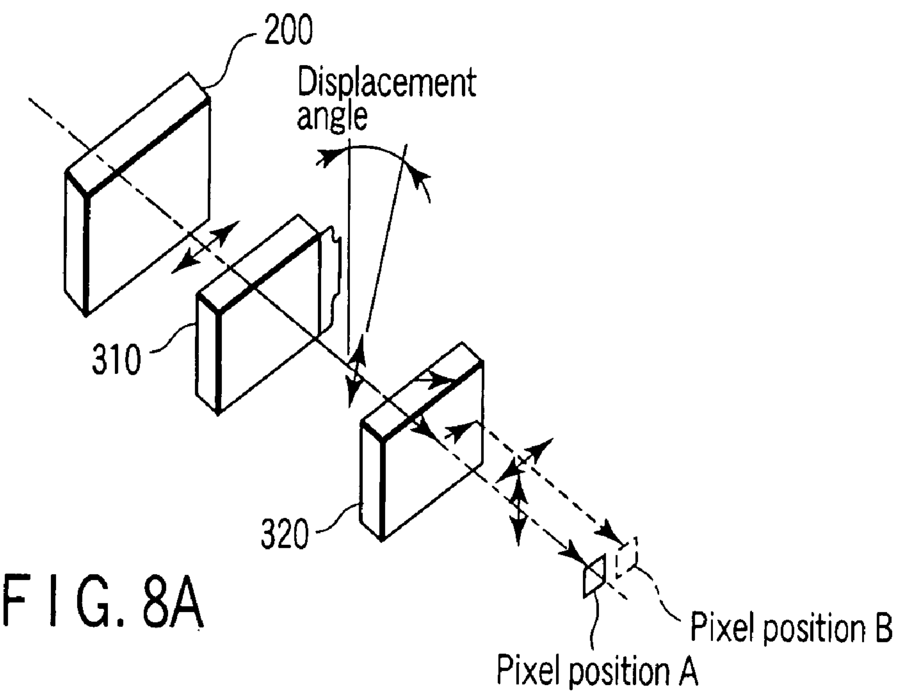
FIG. 8A shows the pixel shift operation of the pixel shift unit according to a second embodiment of the present invention.
Figure 8B:
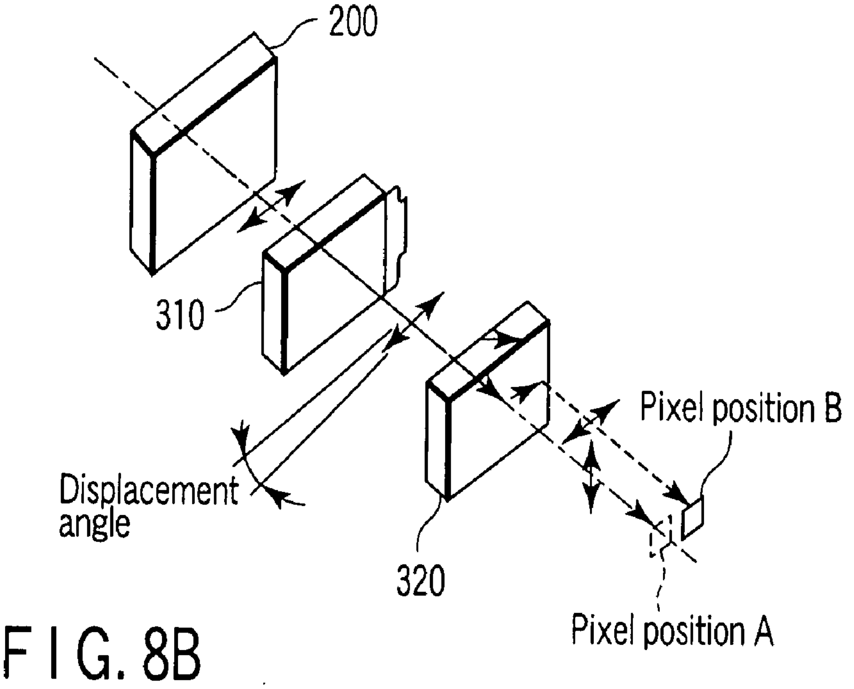
FIG. 8B shows the pixel shift operation of the pixel shift unit according to the second embodiment of the present invention.

FIGS. 8A and 8B illustrate the operation of the pixel shift unit 300 when there are such error factors as described above. FIG. 8A shows the operation when the off voltage is applied to the polarization rotation liquid crystal cell 310. FIG. 8B shows the operation when the on voltage is applied to the polarization rotation liquid crystal cell 310.

Figure 9A:
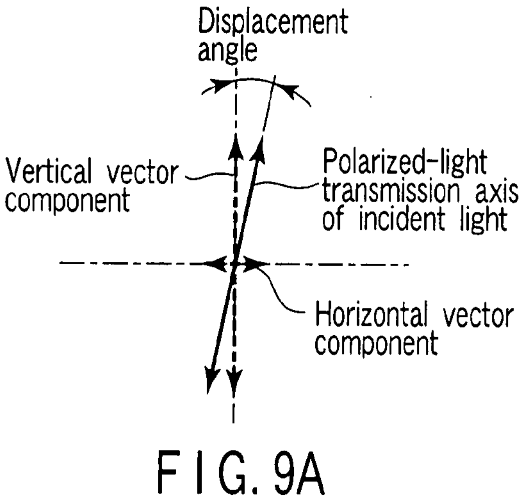
FIG. 9A shows a displacement in the direction of polarization according to the second embodiment of the present invention.

In the case of FIG. 8A (when the off voltage is applied to the polarization rotation liquid crystal cell 310), if the direction of polarization (the direction of polarized-light transmission axis) is ideal, a beam of image light will arrive at the pixel position A alone on the screen but not at the pixel position B on the same principle as in the case of FIG. 2A described in the first embodiment. However, since the direction of polarization is not set ideal, a beam of light incident on the birefringent plate 320 is output therefrom divided into a vector component in the vertical direction and a vector component in the horizontal direction as shown in FIG. 9A. That is, since the vector component in the vertical direction is not shifted in the birefringent plate 320, a light beam having the vector component in the vertical direction arrives at the pixel position A as available light. On the other hand, since the vector component in the horizontal direction is shifted in the birefringent plate 320, a light beam having the vector component in the horizontal direction arrives at the pixel position B as unavailable light.

Figure 9B:
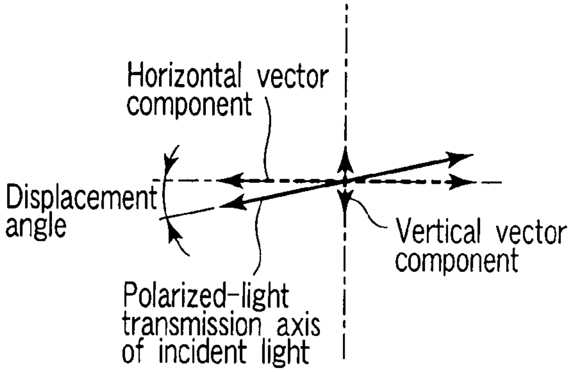
FIG. 9B shows a displacement in the direction of polarization according to the second embodiment of the present invention.

In the case of FIG. 8B (when the on voltage is applied to the polarization rotation liquid crystal cell 310), if the direction of polarization (the direction of polarized-light transmission axis) is ideal, a beam of image light will arrive at the pixel position B alone on the screen but not at the pixel position A on the same principle as in the case of FIG. 2B described in the first embodiment. However, since the direction of polarization is not set ideal, a light beam incident on the birefringent plate 320 is output therefrom divided into a vector component in the vertical direction and a vector component in the horizontal direction as shown in FIG. 9B. As a result, a light beam having the vector component in the horizontal direction arrives at the pixel position B as available light. On the other hand, a light beam having the vector component in the vertical direction arrives at the pixel position A as unavailable light.

When the direction of polarization is not set ideal due to various error factors, the light receiving characteristic of the light receiving device 640 in the sensor unit 600 will also be different from that when the direction of polarization is set ideal as will be described below.

Figure 10:
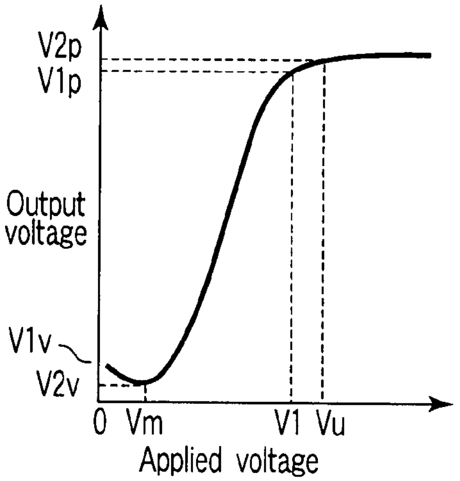
FIG. 10 shows a relationship between the applied voltage of the polarization rotation liquid crystal cell and the output voltage of the light receiving device according to the second embodiment of the present invention.

FIG. 10 shows a relationship between the applied voltage to the polarization rotation liquid crystal cell 310 and the output voltage (light receiving characteristic) of the light receiving device 640 (relationship between applied voltage and output voltage when the polarized-light transmission axes of the polarization plates 620 and 630 are aligned in the same direction as shown in FIG. 3). The curve shown in FIG. 10 varies with the temperature of the polarization rotation liquid crystal cell 310 as well as the error factors described above.

When the applied voltage to the polarization rotation liquid crystal cell 310 is changed from 0 through Vm and V1 to Vu, the output voltage of the light receiving device 640 will change from V1*v* through V2*v* and V1*p* to V2*p*. That is, when the applied voltage to the polarization rotation liquid crystal cell 310 is Vm, the output voltage of the light receiving device 640 is V2*v* (minimum value). When the applied voltage to the polarization rotation liquid crystal cell 310 is Vu, the output voltage of the light receiving device 640 is V2*p*, at which the output voltage is virtually saturated. Thus, the output voltage V2*p* can be taken as the maximum output voltage of the light receiving device 640.

As described above, the output voltage of the light receiving device 640 is minimum when the applied voltage to the polarization rotation liquid crystal cell 310 is Vm but not 0. That is, when the applied voltage to the polarization rotation liquid crystal cell 310 is Vm, the direction of polarization is set best (for example, such states as shown in FIGS. 2A and 2B). It can be said that Vm is the best as the off voltage to the polarization rotation liquid crystal cell 310. Therefore, setting the off voltage to the polarization rotation liquid crystal cell 310 to Vm allows display states close to such ideal states as shown in FIGS. 2A and 2B to be obtained.

The characteristic curve shown in FIG. 10 can be grasped by measuring the characteristic of the polarization rotation liquid crystal cell 310 with the sensor unit 600 shown in FIGS. 1 and 3. Thus, by feeding the measurements by the sensor unit 600 back to the drive signal of the polarization rotation liquid crystal cell 310, it is possible to obtain a drive signal having the optimum drive voltage as will be described below.

Figure 11:
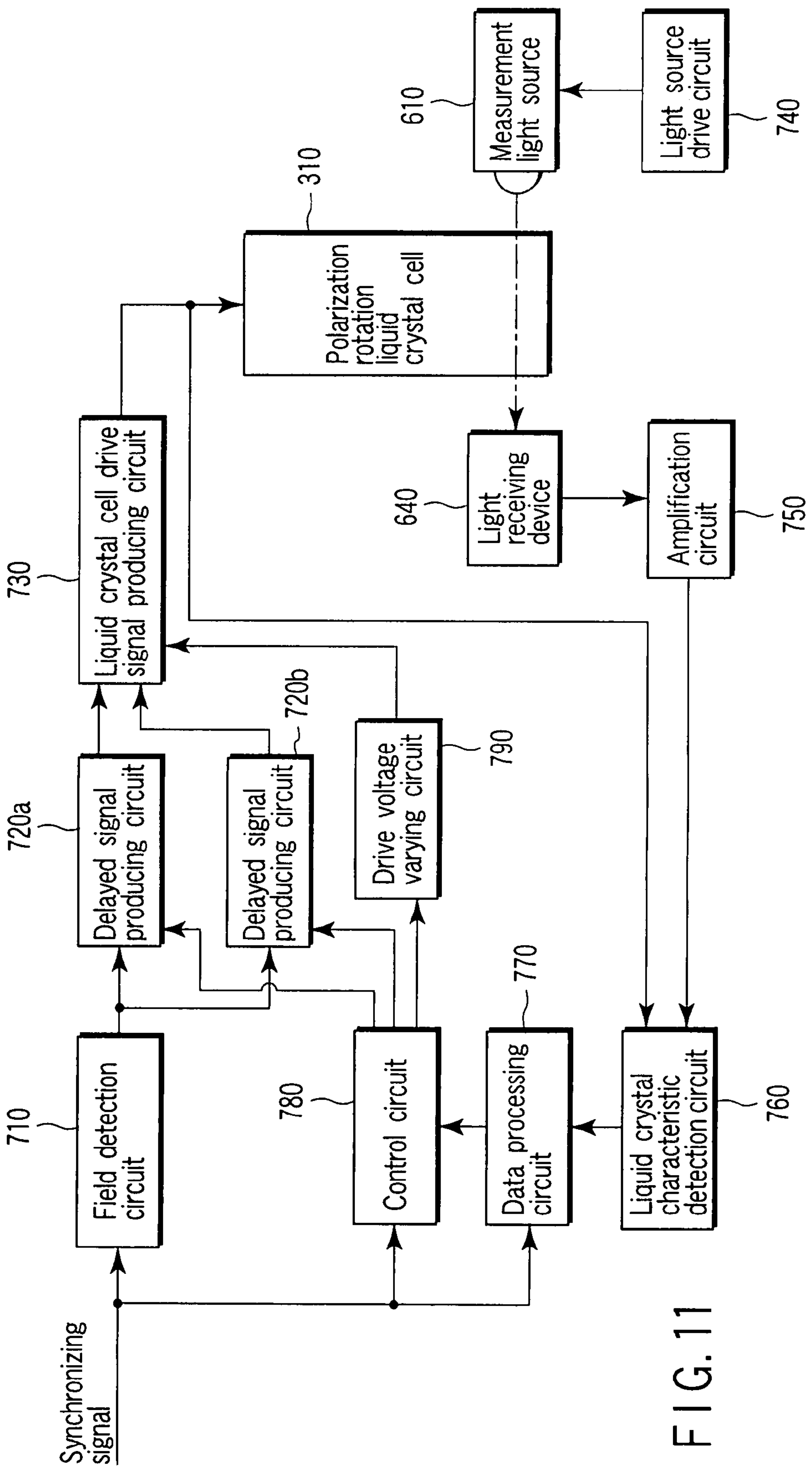
FIG. 11 is a block diagram of the arrangement for drive control of the polarization rotation liquid crystal cell according to the second embodiment of the present invention.

FIG. 11 is a block diagram illustrating the arrangement for drive control of the polarization rotation liquid crystal cell 310 as described above. Since the basic arrangement and operation are the same as those of FIG. 6, corresponding parts to those in FIG. 6 are denoted by like reference numerals and detailed descriptions thereof are omitted.

This embodiment is equipped with a drive voltage varying circuit 790, which is capable of varying the drive voltage to the liquid crystal cell drive signal producing circuit 730. Thus, by varying the drive voltage to the liquid crystal cell drive signal producing circuit 730, such a relationship (relationship between the applied voltage to the polarization rotation liquid crystal cell 310 and the output voltage of the light receiving device 640) as shown in FIG. 10 can be obtained by the liquid crystal characteristic detection circuit 760. On the basis of the obtained relationship between applied voltage and output voltage, the optimum drive voltages (on and off voltages) is calculated by the control circuit 780. The polarization rotation liquid crystal cell 310 is driven with the drive signal having the optimum drive voltages. The measurement for determining the aforementioned relationship may be made during a predetermined interval when no image is projected from the display unit 200 onto the screen 500 (for example, an interval prior to display or an interval during which display is interrupted).

As described previously with reference to FIGS. 8A, 8B, 9A and 9B, if the direction of polarization is not set ideal, modulated light incident on the birefringent plate 320 is output from it divided into light (available light) which arrives at a target pixel position (e.g., the pixel position A in FIG. 8A) and light (unavailable light) which arrives at a pixel position (e.g., the pixel position B in FIG. 8A) adjacent to the target pixel position. If, therefore, the drive signal to the polarization rotation liquid crystal cell 310 is adjusted so as to increase the ratio or difference in light amount between the available light and the unavailable light, the unavailable light can be reduced to improve the display quality. This corresponds to increasing the ratio or difference between the amount of light received by the light receiving device 640 when the off voltage is applied to the polarization rotation liquid crystal cell 310 (rotating state) and the amount of light received by the light receiving device 640 when the on voltage is applied to the polarization rotation liquid crystal cell 310 (non-rotating state). It is therefore desirable for the control circuit 780 to calculate the optimum drive voltages so as to increase the light amount ratio or difference.

Figure 12:
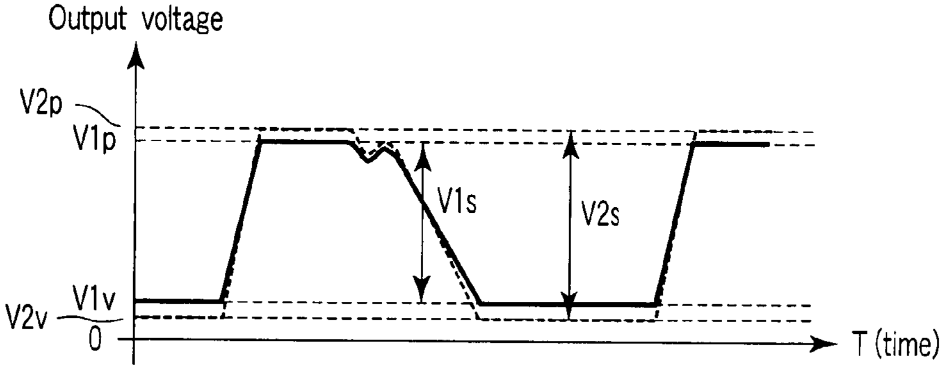
FIG. 12 shows the output voltage of the light receiving device according to the second embodiment of the present invention.

FIG. 12 shows a drive signal of the polarization rotation liquid crystal cell 310. When the polarization rotation liquid crystal cell 310 is driven with such nonoptimum drive voltages (off and on voltages are 0 and V1, respectively) as shown in FIG. 10, the output voltage waveform of the light receiving device 640 becomes as indicated in solid line. That is, the minimum value of the output voltage is V1*v* (off time) and the maximum value is V1*p* (on time) and the difference V1*s* cannot be increased. When the polarization rotation liquid crystal cell 310 is driven with optimum drive voltages (off and on voltages are Vm and Vu, respectively), the output voltage waveform of the light receiving device 640 becomes as indicated in broken line. That is, the minimum value of the output voltage of the light receiving device 640 is V2*v* (off time) and the maximum value is V2*p* (on time) and the difference V2*s* can be increased, allowing the ideal driving to be performed.

Figure 13:
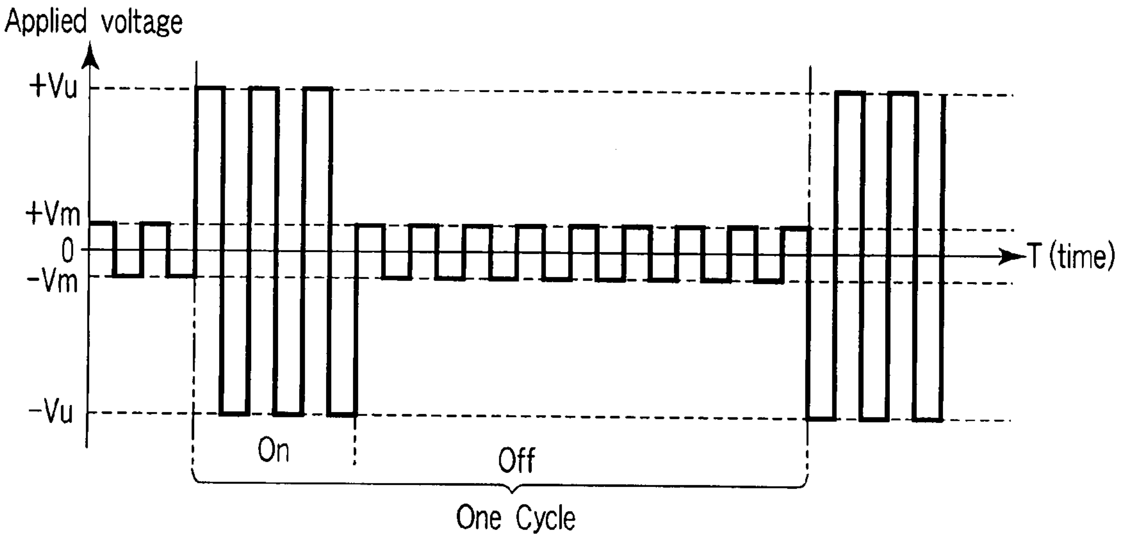
FIG. 13 shows the drive signal of the polarization rotation liquid crystal cell according to the second embodiment of the present invention.

FIG. 13 shows a drive signal used in performing the aforementioned ideal driving. As shown, an alternating voltage of ±Vu and an alternating voltage of ±Vm are applied to the polarization rotation liquid crystal cell 310 as the on and off voltages, respectively. Since the off voltage used is ±Vm and not zero, there is also an advantage that the response speed of the polarization rotation liquid crystal cell 310 can be increased.

In obtaining such a relationship as shown in FIG. 10 (relationship between the applied voltage to the polarization rotation liquid crystal cell 310 and the output voltage of the light receiving device 640), data may be acquired only over a certain range of voltages in the neighborhood of the off voltage and a certain range of voltages in the neighborhood of the on voltage and not over the entire range of voltages. Although the characteristic shown in FIG. 10 varies according to various factors, such as the temperature of the polarization rotation liquid crystal cell 310, the optimum off and on voltages will not vary greatly. Thus, even if data are acquired only over certain ranges of voltages in the neighborhood of the off and on voltages, it is sufficiently possible to acquire required information.

According to the second embodiment, as described above, the same advantages as with the first embodiment can be obtained and moreover the drive voltages of the polarization rotation liquid crystal cell 310 can be optimized, thus allowing the display quality of the image display apparatus to be improved.

Third Embodiment

A third embodiment of the present invention will be described next. This embodiment remains unchanged from the first embodiment in the basic configuration of each of the sensor unit and the image display apparatus. Thus, description of the matters described in the first embodiment is omitted here.

Although the first and second embodiments have been described in terms of image display made on a two-point pixel shift basis, this embodiment provides image display on a four-point pixel shift basis.

Figure 14:
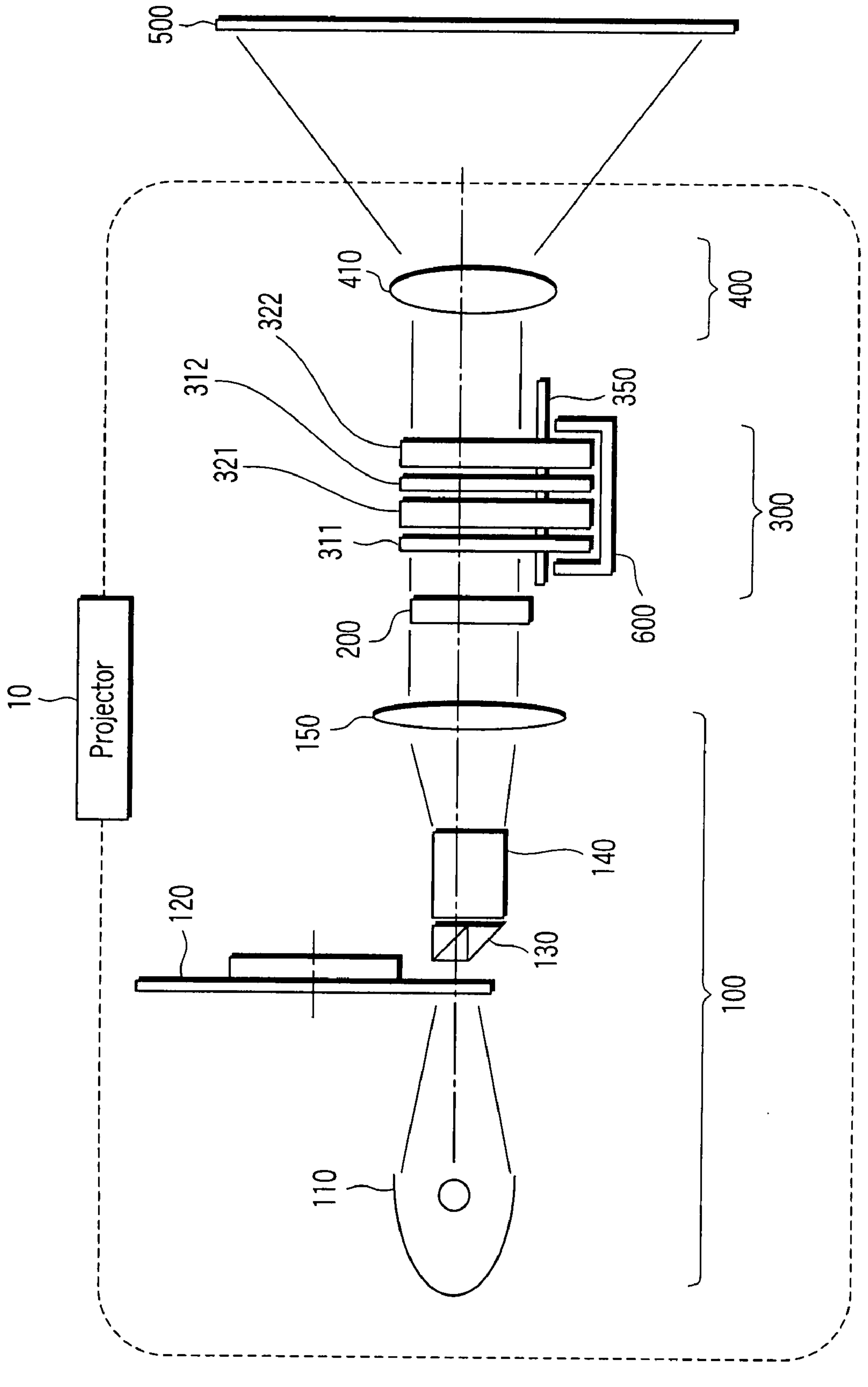
FIG. 14 shows the basic configuration of an image display apparatus having a sensor unit according to a third embodiment of the present invention.

FIG. 14 shows the basic configuration of an image display apparatus (image projection apparatus) according to the third embodiment.

With this embodiment, to make image display on a four-point pixel shift basis, the pixel shift unit (wobbling unit) 300 is constructed from a first polarization rotation liquid crystal cell 311, a first birefringent plate 321, a second polarization rotation liquid crystal cell 312, and a second birefringent plate 322.

In addition, in this embodiment, a light-tight member 350 is placed between the display area through which projection light (image light) from the display unit 200 passes and the measurement area through which measurement light measured by the sensor unit 600 passes. The light-tight member 350 can isolate the image light and the measurement light from each other to prevent them from influencing each other. It is therefore possible to prevent the image display quality from degrading and improve the measurement accuracy. As the light-tight member 350 use may be made of, for example, a light-tight black sheet or a light intercepting element (for example, a flocking sheet).

Figure 15A:
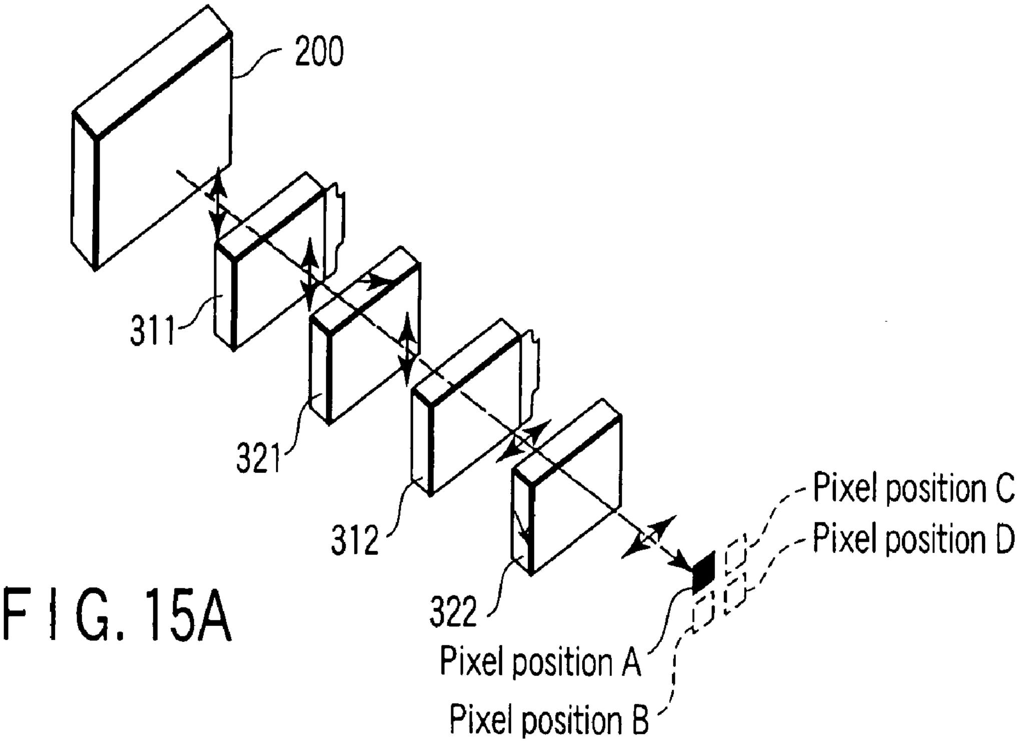
FIG. 15A shows the principle of the pixel shift operation of the pixel shift unit according to the third embodiment of the present invention.
Figure 15B:
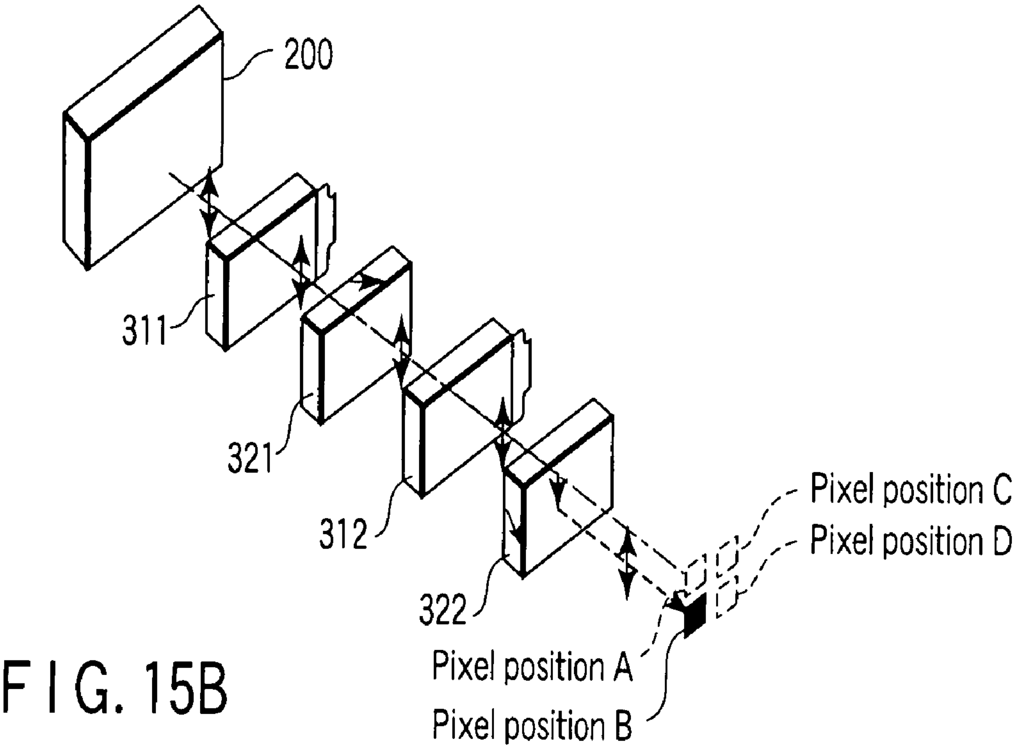
FIG. 15B shows the principle of the pixel shift operation of the pixel shift unit according to the third embodiment of the present invention.
Figure 15C:
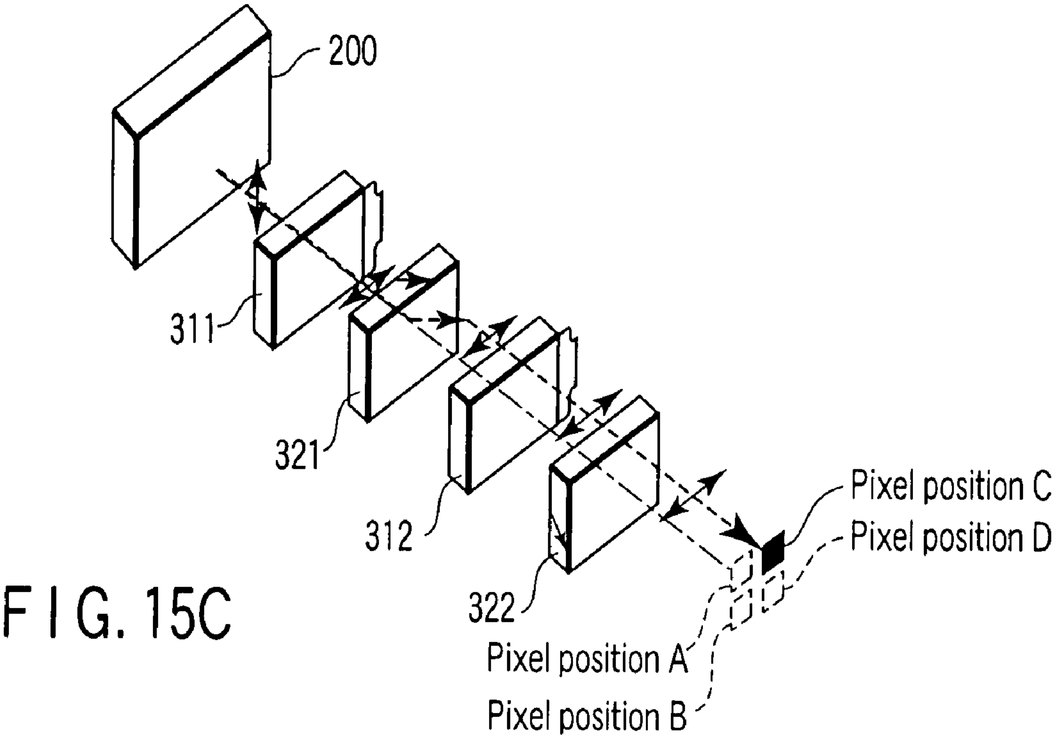
FIG. 15C shows the principle of the pixel shift operation of the pixel shift unit according to the third embodiment of the present invention.
Figure 15D:
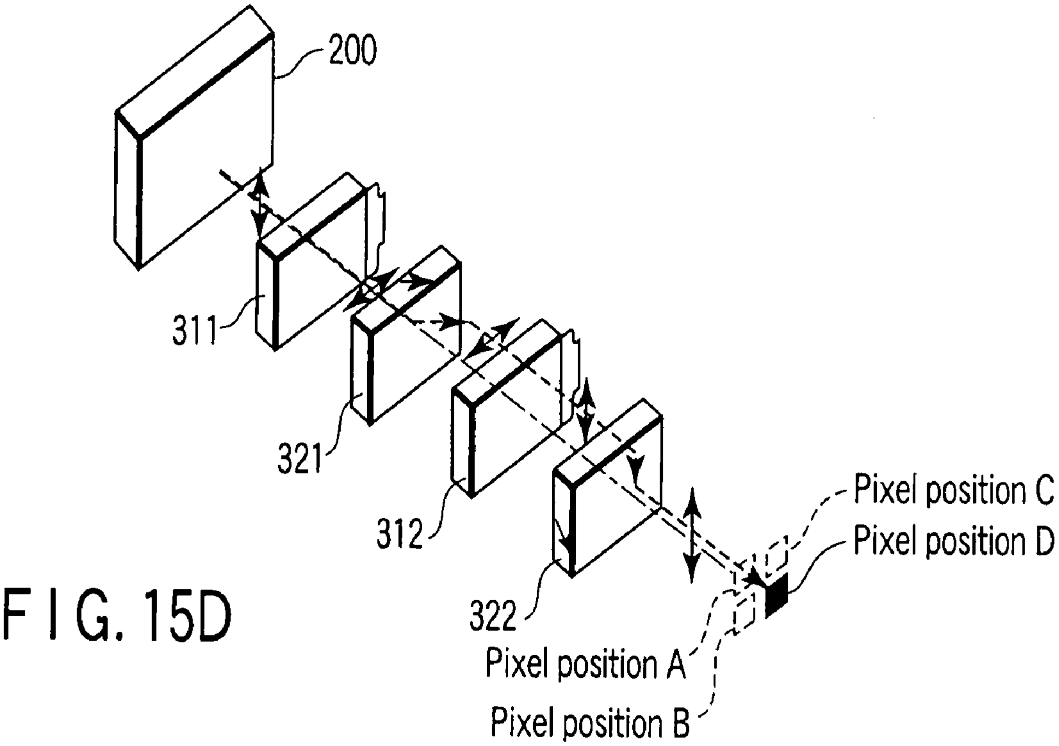
FIG. 15D shows the principle of the pixel shift operation of the pixel shift unit according to the third embodiment of the present invention.

FIGS. 15A through 15D illustrate the principle of the four-point pixel shift operation by the pixel shift unit 300. FIG. 15A illustrates the operation when on and off voltages are applied to the first and second polarization rotation liquid crystal cells 311 and 312, respectively. FIG. 15B illustrates the operation when the on voltage is applied to each of the first and second polarization rotation liquid crystal cells 311 and 312. FIG. 15C illustrates the operation when the off and on voltages are applied to the first and second polarization rotation liquid crystal cells 311 and 312, respectively. FIG. 15D illustrates the operation when the off voltage is applied to each of the first and second polarization rotation liquid crystal cells 311 and 312.

The operation illustrated in FIG. 15A will be described first. As image light (modulated light), polarized light having the polarized-light transmission axis in the vertical direction is output from the display unit 200. Since the on voltage is being applied to the first polarization rotation liquid crystal cell 311, the polarized light passes through it without being rotated. The polarized light emerging from the first polarization rotation liquid crystal cell 311 passes through the first birefringent plate 321 without being shifted and is then directed to the second polarization rotation liquid crystal cell 312. In the second polarization rotation liquid crystal cell 312 which is being supplied with the off voltage, the polarized light having the polarized-light transmission axis in the vertical direction is rotated through 90 degrees and then output as polarized light having the polarized-light transmission axis in the horizontal direction. The polarized light emerging from the second polarization rotation liquid crystal cell 312 passes through the second birefringent plate 322 without being shifted. As a result, a beam of image light arrives at pixel position A on the screen 500.

The operation illustrated in FIG. 15B will be described next. As image light (modulated light), polarized light having the vertical polarized-light transmission axis is output from the display unit 200. Since the on voltage is being applied to the first polarization rotation liquid crystal cell 311, the polarized light passes through it without being rotated. The polarized light emerging from the first polarization rotation liquid crystal cell 311 passes through the first birefringent plate 321 without being shifted and is then directed to the second polarization rotation liquid crystal cell 312. Since the second polarization rotation liquid crystal cell 312 is being supplied with the on voltage, the polarized light having the vertical polarized-light transmission axis passes through it without being rotated. The polarized light emerging from the second polarization rotation liquid crystal cell 312 passes through the second birefringent plate 322 while being shifted in the vertical direction. As a result, a beam of image light arrives at pixel position B on the screen 500.

The operation illustrated in FIG. 15C will be described next. As image light (modulated light), polarized light having the vertical polarized-light transmission axis is output from the display unit 200. Since the off voltage is being applied to the first polarization rotation liquid crystal cell 311, the polarized light is rotated through 90 degrees and output as polarized light having the horizontal polarized-light transmission axis. The polarized light emerging from the first polarization rotation liquid crystal cell 311 passes through the first birefringent plate 321 while being shifted in the horizontal direction and is then directed to the second polarization rotation liquid crystal cell 312. Since the second polarization rotation liquid crystal cell 312 is being supplied with the on voltage, the polarized light having the horizontal polarized-light transmission axis passes through it without being rotated. The polarized light emerging from the second polarization rotation liquid crystal cell 312 passes through the second birefringent plate 322 without being shifted. As a result, a beam of image light arrives at pixel position C on the screen 500.

The operation illustrated in FIG. 15D will be described next. As image light (modulated light), polarized light having the vertical polarized-light transmission axis is output from the display unit 200. Since the off voltage is being applied to the first polarization rotation liquid crystal cell 311, the polarized light is rotated through 90 degrees and output as polarized light having the horizontal polarized-light transmission axis. The polarized light emerging from the first polarization rotation liquid crystal cell 311 passes through the first birefringent plate 321 while being shifted in the horizontal direction and is then directed to the second polarization rotation liquid crystal cell 312. Since the second polarization rotation liquid crystal cell 312 is being supplied with the off voltage, the polarized light having the horizontal polarized-light transmission axis is rotated through 90 degrees and output as polarized light having the vertical polarized-light transmission axis. The polarized light emerging from the second polarization rotation liquid crystal cell 312 passes through the second birefringent plate 322 while being shifted in the vertical direction. As a result, a beam of image light arrives at pixel position D on the screen 500.

As can be seen from the foregoing, switching each of the polarization rotation liquid crystal cells 311 and 312 on or off allows the position on the screen 500 at which the image light arrives to be controlled. Therefore, by switching each of the polarization rotation liquid crystal cells 311 and 312 on or off in synchronization with the modulation timing of the display unit 200, the display states shown in FIGS. 15A, 15B, 15C and 15D can be combined in the direction of time axis. As a result, an image having quadruple as many pixels as the display unit 200 can be displayed on the screen 500.

Figure 16:
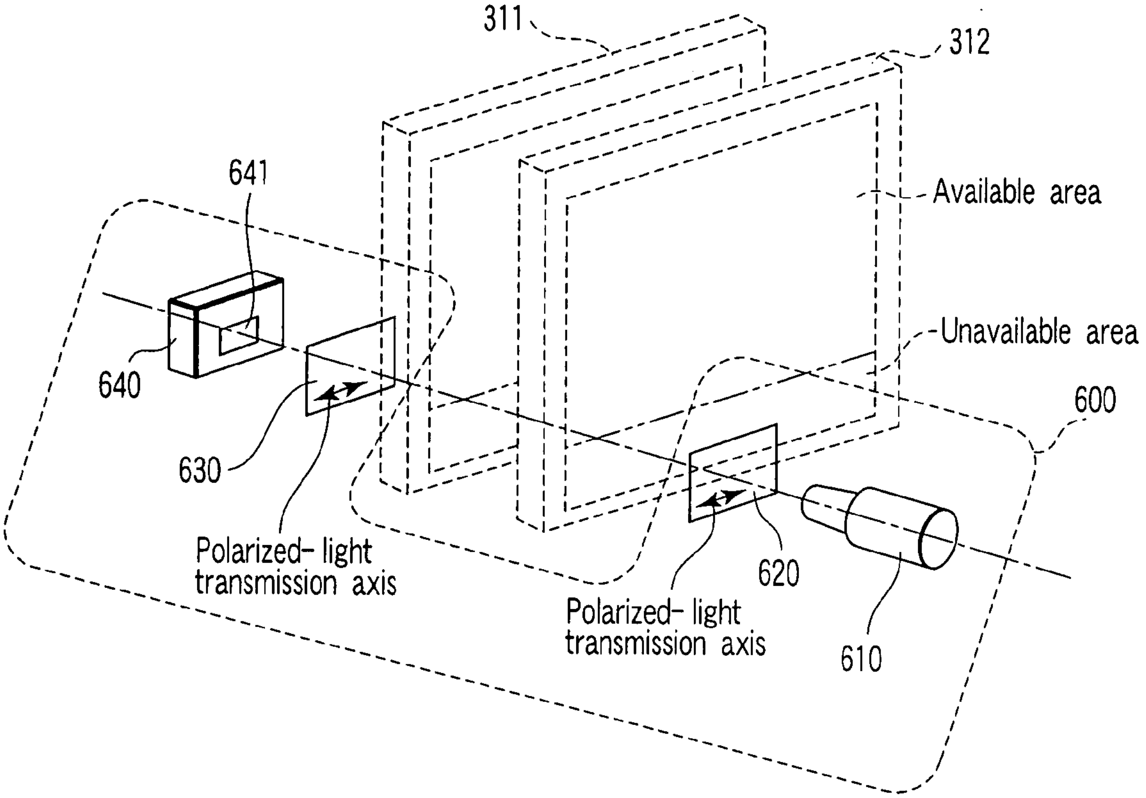
FIG. 16 shows the configuration of the sensor unit according to the third embodiment of the present invention.

FIG. 16 shows the configuration of the sensor unit 600 shown in FIG. 14, which allows the response characteristic of each of the polarization rotation liquid crystal cells 311 and 312 to be measured. Although the basic configuration of the sensor unit 600 is the same as that shown in FIG. 3 in the first embodiment, in this embodiment the polarization rotation liquid crystal cells 311 and 312 are placed between the polarization plates 620 and 630.

It is required to place the birefringent plates 321 and 322 in the display area through which image light from the display unit 200 passes (corresponding to the available area of FIG. 16); however, they are not necessarily required to be placed in the measurement area through which measurement light passes (corresponding to the unavailable area of FIG. 16). That is, the amount by which light is shifted by the birefringent plates 321 and 322 (the pixel shift amount) is half of the pixel pitch (usually of the order of several 10 μm), which is sufficiently small in comparison with the size of the light receiving area 641 of the light receiving device 640 (usually of the order of 1 mm). Therefore, it does not matter whether the birefringent plates 321 and 322 are placed in the measurement area or not.

Figure 17A:
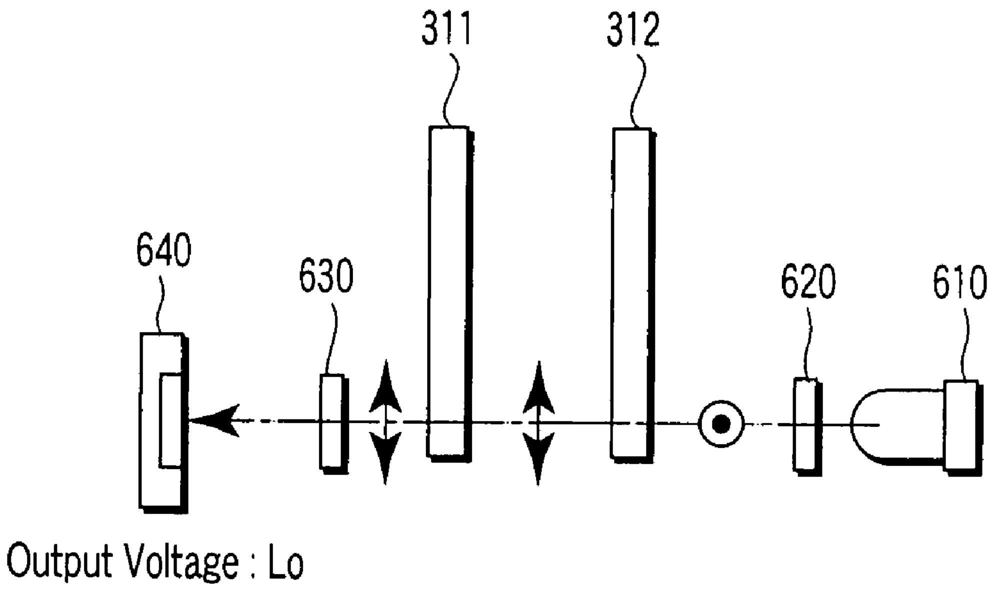
FIG. 17A is a diagram for use in explanation of the operation of the sensor unit according to the third embodiment of the present invention.
Figure 17B:
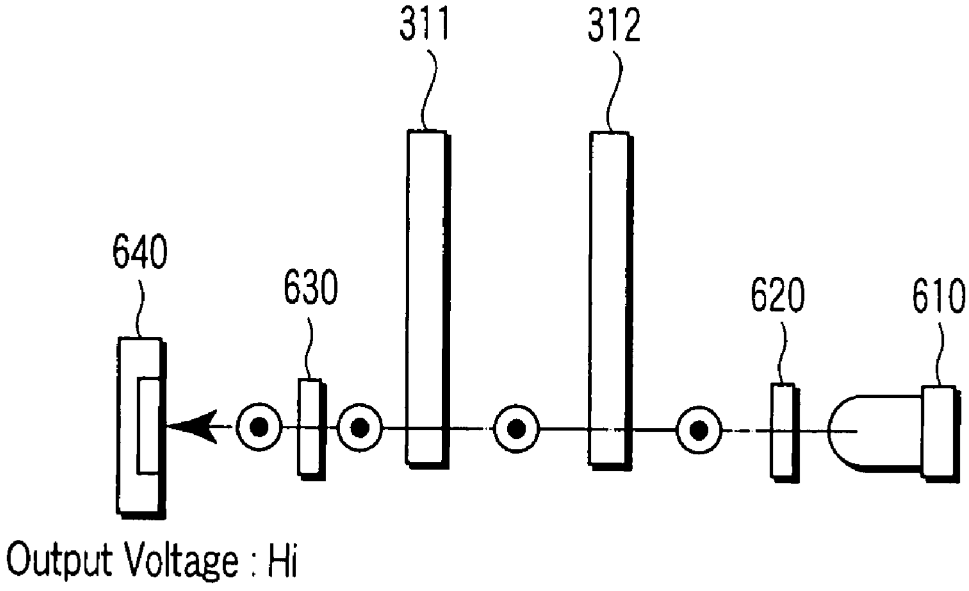
FIG. 17B is a diagram for use in explanation of the operation of the sensor unit according to the third embodiment of the present invention.
Figure 17C:
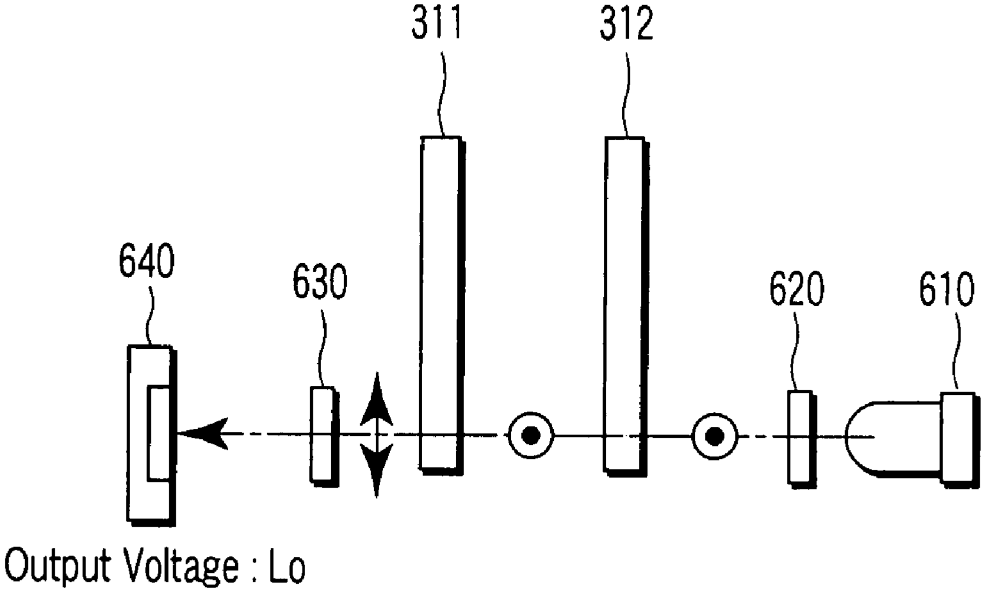
FIG. 17C is a diagram for use in explanation of the operation of the sensor unit according to the third embodiment of the present invention.
Figure 17D:
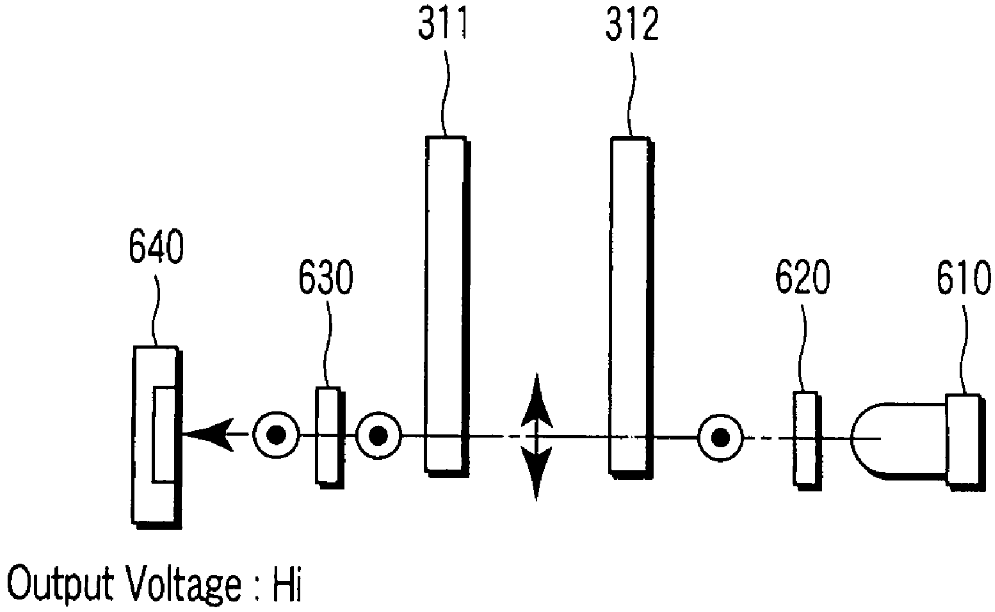
FIG. 17D is a diagram for use in explanation of the operation of the sensor unit according to the third embodiment of the present invention.

FIGS. 17A through 17D are diagrams for use in explanation of the operation of the sensor unit 600. FIG. 17A illustrates the operation when on and off voltages are applied to the first and second polarization rotation liquid crystal cells 311 and 312, respectively. FIG. 17B illustrates the operation when the on voltage is applied to each of the first and second polarization rotation liquid crystal cells 311 and 312. FIG. 17C illustrates the operation when the off and on voltages are applied to the first and second polarization rotation liquid crystal cells 311 and 312, respectively. FIG. 17D illustrates the operation when the off voltage is applied to each of the first and second polarization rotation liquid crystal cells 311 and 312.

First, the operation of FIG. 17A will be described. The measurement light from the measurement light source 610 is transformed by the polarization plate 620 into polarized light having the horizontal polarized-light transmission axis and then directed to the second polarization rotation liquid crystal cell 312. Since the second polarization rotation liquid crystal cell 312 is being supplied with the off voltage, the polarized light incident on it is rotated through 90 degrees and consequently polarized light having the vertical polarized-light transmission axis is output from it. The polarized light emerging from the second polarization rotation liquid crystal cell 312 is directed to the first polarization rotation liquid crystal cell 311. Since the first polarization rotation liquid crystal cell 311 is being supplied with the on voltage, the polarized light incident on the first polarization rotation liquid crystal cell 311 emerges from it without being rotated. The polarized light emerging from the first polarization rotation liquid crystal cell 311 arrives at the plane of incidence of the polarization plate 630 but will not passes through it because it has the horizontal polarized-light transmission axis. For this reason, the measurement light does not arrive at the light receiving device 640 and the amount of light received by the light receiving device 640 is virtually zero. As a result, the output of the light receiving device 640 is at a low voltage (Lo).

Next, the operation of FIG. 17B will be described. The measurement light from the measurement light source 610 is transformed by the polarization plate 620 into polarized light having the horizontal polarized-light transmission axis and then directed to the second polarization rotation liquid crystal cell 312. Since the second polarization rotation liquid crystal cell 312 is being supplied with the on voltage, the polarized light incident on it is emerged from it without being rotated. The polarized light emerging from the second polarization rotation liquid crystal cell 312 is directed to the first polarization rotation liquid crystal cell 311. Since the first polarization rotation liquid crystal cell 311 is being supplied with the on voltage, the polarized light incident on it is output from it without being rotated. The polarized light emerging from the first polarization rotation liquid crystal cell 311, having the horizontal polarized-light transmission axis, passes through the polarization plate 630 having the horizontal polarized-light transmission axis. For this reason, the measurement light arrives at the light receiving device 640. As a result, the output voltage of the light receiving device 640 goes high (Hi).

Next, the operation of FIG. 17C will be described. The measurement light from the measurement light source 610 is transformed by the polarization plate 620 into polarized light having the horizontal polarized-light transmission axis and then directed to the second polarization rotation liquid crystal cell 312. Since the second polarization rotation liquid crystal cell 312 is being supplied with the on voltage, the polarized light incident on it is output from it without being rotated. The polarized light emerging from the second polarization rotation liquid crystal cell 312 is directed to the first polarization rotation liquid crystal cell 311. Since the first polarization rotation liquid crystal cell 311 is being supplied with the off voltage, the polarized light incident on it is rotated through 90 degrees and output from it as polarized light having the vertical polarized-light transmission axis. The polarized light emerging from the first polarization rotation liquid crystal cell 311 arrives at the plane of incidence of the polarization plate 630 but will not pass through it because it has the horizontal polarized-light transmission axis. For this reason, the measurement light does not arrive at the light receiving device 640 and the amount of light received by the light receiving device 640 is virtually zero. As a result, the output voltage of the light receiving device 640 is low (Lo).

Next, the operation of FIG. 17D will be described. The measurement light from the measurement light source 610 is transformed by the polarization plate 620 into polarized light having the horizontal polarized-light transmission axis and then directed to the second polarization rotation liquid crystal cell 312. Since the second polarization rotation liquid crystal cell 312 is being supplied with the off voltage, the polarized light incident on it is rotated through 90 degrees and output from it as polarized light having the vertical polarized-light transmission axis. The polarized light emerging from the second polarization rotation liquid crystal cell 312 is directed to the first polarization rotation liquid crystal cell 311. Since the first polarization rotation liquid crystal cell 311 is being supplied with the off voltage, the polarized light incident on it is rotated through 90 degrees and output from it as polarized light having the horizontal polarized-light transmission axis. The polarized light emerging from the first polarization rotation liquid crystal cell 311, having the horizontal polarized-light transmission axis, passes through the polarization plate 630 having the horizontal polarized-light transmission axis. As a result, the measurement light arrives at the light receiving device 640. As a result, the output voltage of the light receiving device 640 goes high (Hi).

As can be seen from the foregoing, the output voltage of the light receiving device 640 is low (Lo) in the cases of FIGS. 17A and 17C and high (Hi) in the cases of FIGS. 17B and 17D.

Figure 18:
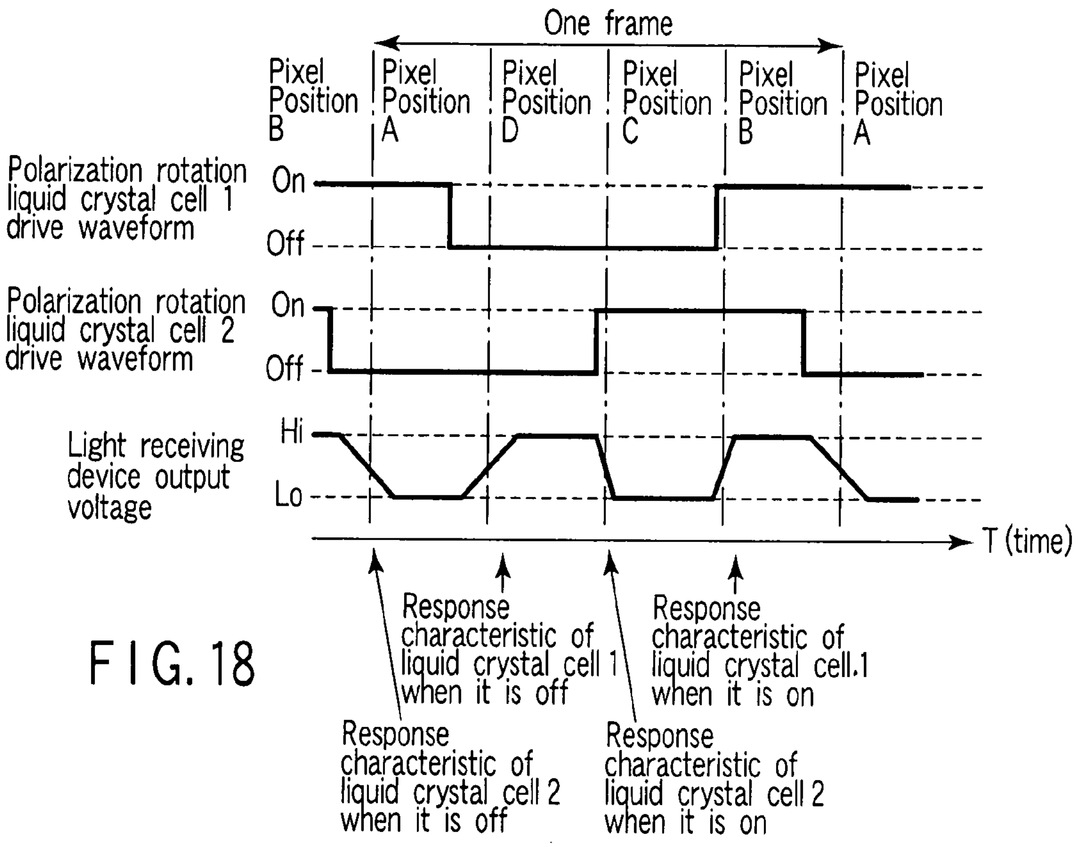
FIG. 18 shows a relationship between the drive signal of the polarization rotation liquid crystal cell and the output voltage of the light receiving device according to the third embodiment of the present invention.
Figure 19:
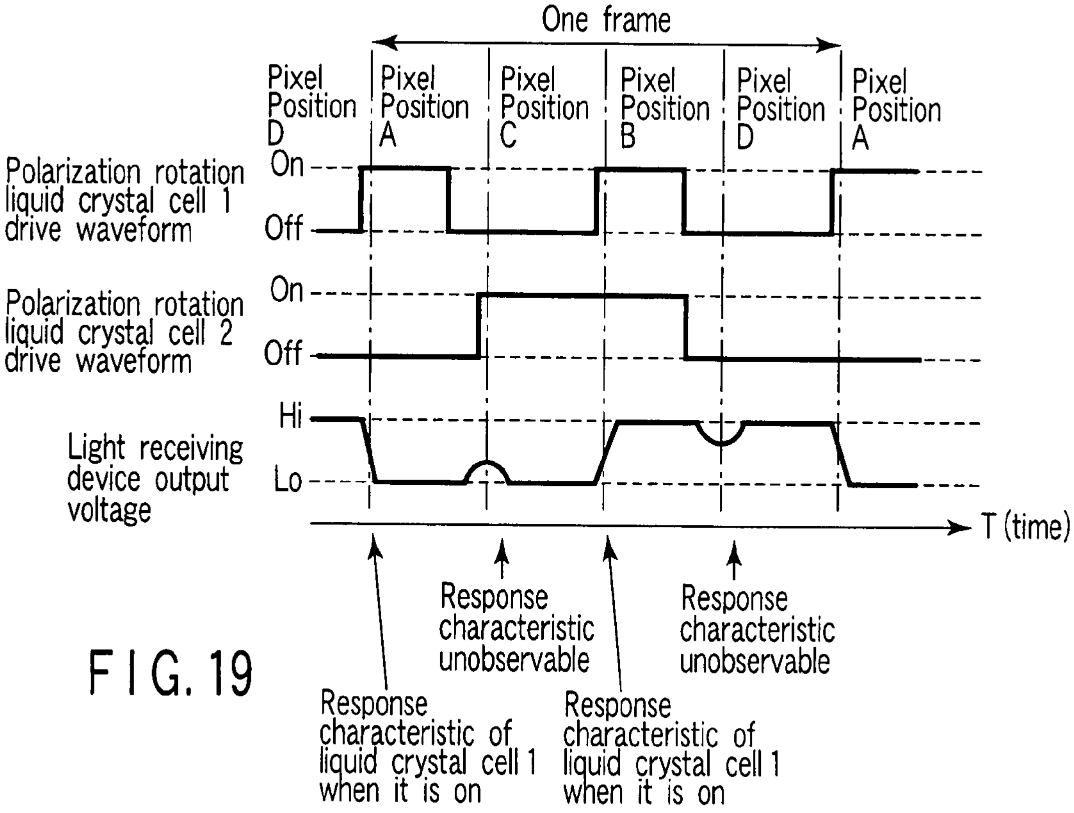
FIG. 19 shows a relationship between the drive signal of the polarization rotation liquid crystal cell and the output voltage of the light receiving device according to a comparative example for the third embodiment of the present invention.

FIG. 18 shows a relationship among the drive signal of the first polarization rotation liquid crystal cell 311, the drive signal of the second polarization rotation liquid crystal cell 312, and the output voltage of the light receiving device 640 in this embodiment. FIG. 19 shows a relationship among the drive signal of the first polarization rotation liquid crystal cell 311, the drive signal of the second polarization rotation liquid crystal cell 312, and the output voltage of the light receiving device 640 in a comparative example for this embodiment.

In the comparative example shown in FIG. 19, four-point pixel shifts are performed such that the pixel positions are ordered A, C, B, D.

At the time when a shift is made from pixel position D to pixel position A, the operation of the sensor unit 600 goes from the state of FIG. 17D to the state of FIG. 17A. Thus, the output of the light receiving device 640 is shifted from the high voltage (Hi) to the low voltage (Lo). On the basis of the output voltage characteristic of the light receiving device 640, the response characteristic of the first polarization rotation liquid crystal cell 311 when its applied voltage is shifted from the off voltage to the on voltage can be determined.

At the time when a shift is made from pixel position A to pixel position C, the operation of the sensor unit 600 goes from the state of FIG. 17A to the state of FIG. 17C. Thus, the output of the light receiving device 640 is merely shifted from the low voltage (Lo) to the low voltage (Lo). For this reason, neither of the response characteristics of the first and second polarization rotation liquid crystal cells 311 and 312 can be determined. In FIG. 19, the time when the applied voltage of the first polarization rotation liquid crystal cell 311 is shifted from the on voltage to the off voltage and the time when the applied voltage of the second polarization rotation liquid crystal cell 312 is shifted from the off voltage to the on voltage is a little displaced. This is because the optimum driving is performed taking into consideration that the rising and falling response speeds of the polarization rotation liquid crystal cell differ from each other as described previously.

At the time when a shift is made from pixel position C to pixel position B, the operation of the sensor unit 600 goes from the state of FIG. 17C to the state of FIG. 17B. Thus, the output of the light receiving device 640 is shifted from the low voltage (Lo) to the high voltage (Hi). On the basis of the output voltage characteristic of the light receiving device 640, the response characteristic of the first polarization rotation liquid crystal cell 311 when its applied voltage is shifted from the off voltage to the on voltage can be determined.

At the time when a shift is made from pixel position B to pixel position D, the operation of the sensor unit 600 goes from the state of FIG. 17B to the state of FIG. 17D. Thus, the output of the light receiving device 640 is merely shifted from the high voltage (Hi) to the high voltage (Hi). For this reason, neither of the response characteristics of the first and second polarization rotation liquid crystal cells 311 and 312 can be determined.

Thus, with four-point pixel shifts such that the pixel positions are ordered A, C, B, D, it is possible to determine the response characteristic of the first polarization rotation liquid crystal cell 311 when its applied voltage is shifted from the off voltage to the on voltage. However, it is difficult to determine the response characteristic of the first polarization rotation liquid crystal cell 311 when its applied voltage is shifted from the on voltage to the off voltage and the response characteristic of the second polarization rotation liquid crystal cell 312.

In this embodiment, therefore, driving is performed such that the transition timing of the drive signal of the first polarization rotation liquid crystal cell 311 and the transition timing of the drive signal of the second polarization rotation liquid crystal cell 312 are not coincident with each other. For example, as shown in FIG. 18, four-point pixel shifts are made such that the pixel positions are ordered A, D, C, B.

At the time when a shift is made from pixel position B to pixel position A, the operation of the sensor unit 600 changes from the state of FIG. 17B to the state of FIG. 17A. Thus, the output of the light receiving device 640 goes from the high voltage (Hi) to the low voltage (Lo). On the basis of the output voltage characteristic of the light receiving device 640, the response characteristic of the second polarization rotation liquid crystal cell 312 when its applied voltage is shifted from the on voltage to the off voltage can be determined.

At the time when a shift is made from pixel position A to pixel position D, the operation of the sensor unit 600 changes from the state of FIG. 17A to the state of FIG. 17D. Thus, the output of the light receiving device 640 goes from the low voltage (Lo) to the high voltage (Hi). On the basis of the output voltage characteristic of the light receiving device 640, the response characteristic of the first polarization rotation liquid crystal cell 311 when its applied voltage is shifted from the on voltage to the off voltage can be determined.

At the time when a shift is made from pixel position D to pixel position C, the operation of the sensor unit 600 changes from the state of FIG. 17D to the state of FIG. 17C. Thus, the output of the light receiving device 640 goes from the high voltage (Hi) to the low voltage (Lo). On the basis of the output voltage characteristic of the light receiving device 640, the response characteristic of the second polarization rotation liquid crystal cell 312 when its applied voltage is shifted from the off voltage to the on voltage can be determined.

At the time when a shift is made from pixel position C to pixel position B, the operation of the sensor unit 600 changes from the state of FIG. 17C to the state of FIG. 17B. Thus, the output of the light receiving device 640 goes from the low voltage (Lo) to the high voltage (Hi). On the basis of the output voltage characteristic of the light receiving device 640, the response characteristic of the first polarization rotation liquid crystal cell 311 when its applied voltage is shifted from the off voltage to the on voltage can be determined.

Thus, with four-point pixel shifts such that the pixel positions are ordered A, D, C, B, the response characteristic of each of the first and second polarization rotation liquid crystal cells can be determined when its applied voltage is shifted from the off voltage to the on voltage and vice versa.

According to this embodiment, as described above, the pixel shifting sequence is defined such that the transition timing of the drive signal of the first polarization rotation liquid crystal cell 311 and the transition timing of the drive signal of the second polarization rotation liquid crystal cell 312 are not coincident with each other. Thereby, the response characteristic of each of the first and second polarization rotation liquid crystal cells 311 and 312 can be obtained with certainty.

Fourth Embodiment

A fourth embodiment of the present invention will be described next. The basic configuration of each of the sensor unit and the image display apparatus is the same as that in the third embodiment. Thus, description of the matters described in the third embodiment is omitted here. In this embodiment as well, as with the third embodiment, image display is made on a four-point pixel shift basis.

In this embodiment, the first and second polarization rotation liquid crystal cells 311 and 312 are each configured so that each of the display area through which image light from the display unit 200 passes (corresponding to the available area in FIG. 16) and the measurement area through which measurement light passes (corresponding to the unavailable area in FIG. 16) can be driven separately.

Figure 20:
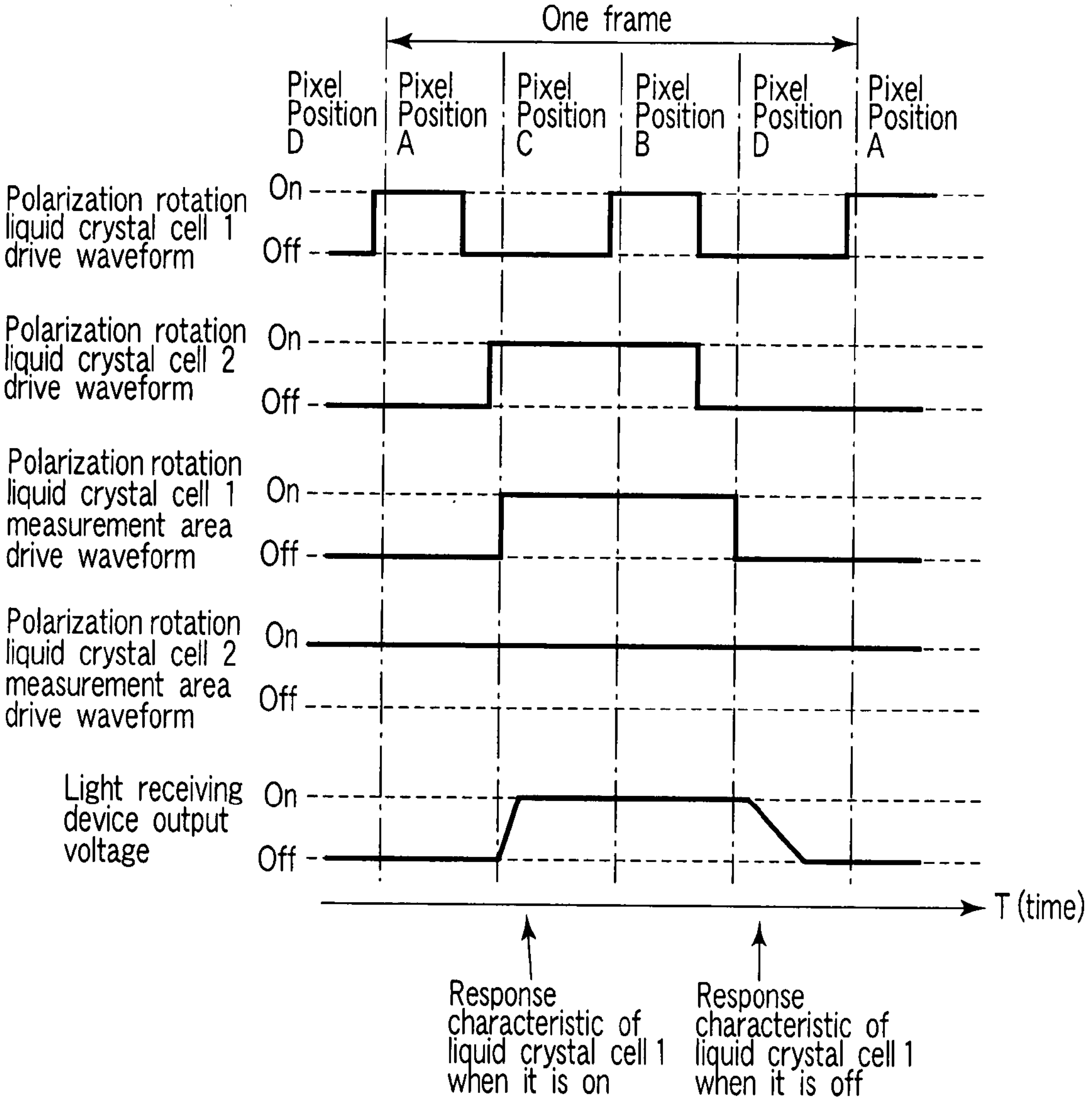
FIG. 20 shows a relationship between the drive signal of the polarization rotation liquid crystal cell and the output voltage of the light receiving device according to a fourth embodiment of the present invention.

FIG. 20 shows drive signals for each of the first and second polarization rotation liquid crystal cells 311 and 312 and the output voltage of the light receiving device 640. In this embodiment, since each of the display area and the measurement area can be driven separately, a drive signal different from the one for the display area can be applied to the measurement area. Therefore, even if the same drive signals as those in FIG. 19 (the comparative example for the third embodiment) are applied to the display areas, such a problem as described in the third embodiment will not arise.

In the example shown in FIG. 20, a drive signal consisting of on and off voltages is applied to the measurement area of the first polarization rotation liquid crystal cell 311 and only the on voltage is continuously applied to the measurement area of the second polarization rotation liquid crystal cell 312 instead of applying a measurement drive signal. Thus, by applying a measurement drive signal only to the measurement area of the first polarization rotation liquid crystal cell 311, a voltage corresponding to its response characteristic is output from the light receiving device 640. Thereby, only the response characteristic of the first polarization rotation liquid crystal cell 311 can be obtained. In contrast to the above driving, though not shown, by applying a measurement drive signal only to the measurement area of the second polarization rotation liquid crystal cell 312, only the response characteristic of the second polarization rotation liquid crystal cell 312 can be obtained.

Figure 21:
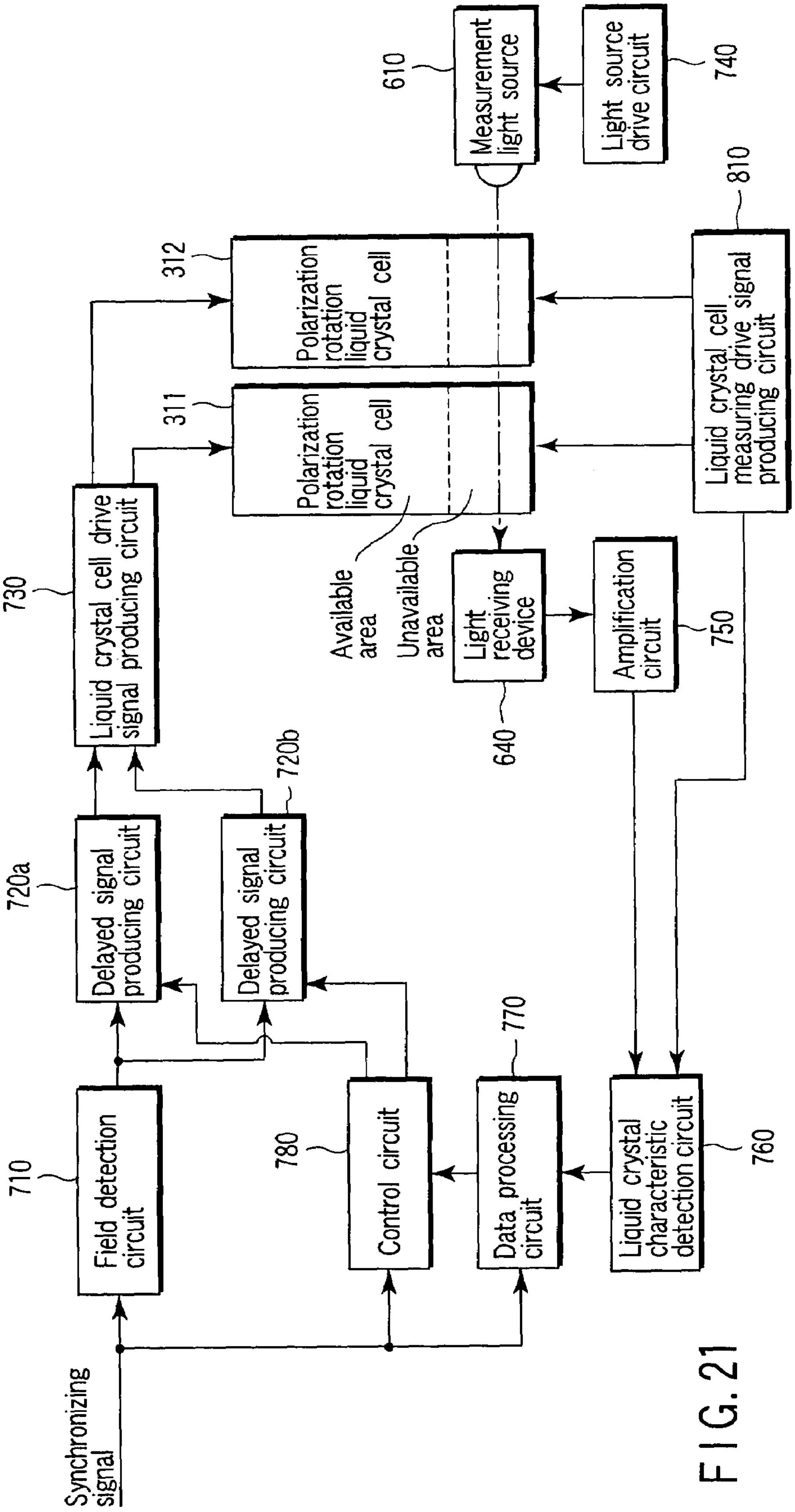
FIG. 21 is a block diagram of the arrangement for drive control of the polarization rotation liquid crystal cell according to the fourth embodiment of the present invention.

FIG. 21 is a block diagram of the configuration for drive control of the polarization rotation liquid crystal cells 311 and 312 in this embodiment. The basic configuration remains unchanged from that shown in FIG. 6 in the first embodiment. Thus, the description of matters described in conjunction with FIG. 6 is omitted here.

In this embodiment, in order to separately drive each of the display and measurement areas of the polarization rotation liquid crystal cells 311 and 312, a liquid crystal cell measuring drive signal producing circuit 810 is set to drive the measurement area of each of the polarization rotation liquid crystal cells 311 and 312.

As described above, in this embodiment, the polarization rotation liquid crystal cells 311 and 312 are configured so as to be able to drive each of the display area and the measurement area separately. Thus, by applying a drive signal which is different from one for the display area to the measurement area, the response characteristic of each of the polarization rotation liquid crystal cells 311 and 312 can be obtained with certainty. That is, even if the pixel positions (A, B, C, D) are not set in a specific order of display as in the third embodiment, the response characteristics of the polarization rotation liquid crystal cells 311 and 312 can be obtained with certainty.

Fifth Embodiment

A fifth embodiment of the present invention will be described next. The basic configuration of each of the sensor unit and the image display apparatus is the same as that in the third embodiment. Thus, description of the matters described in the third embodiment is omitted here. In this embodiment as well, as with the third embodiment, image display is made on a four-point pixel shift basis.

Figure 22:
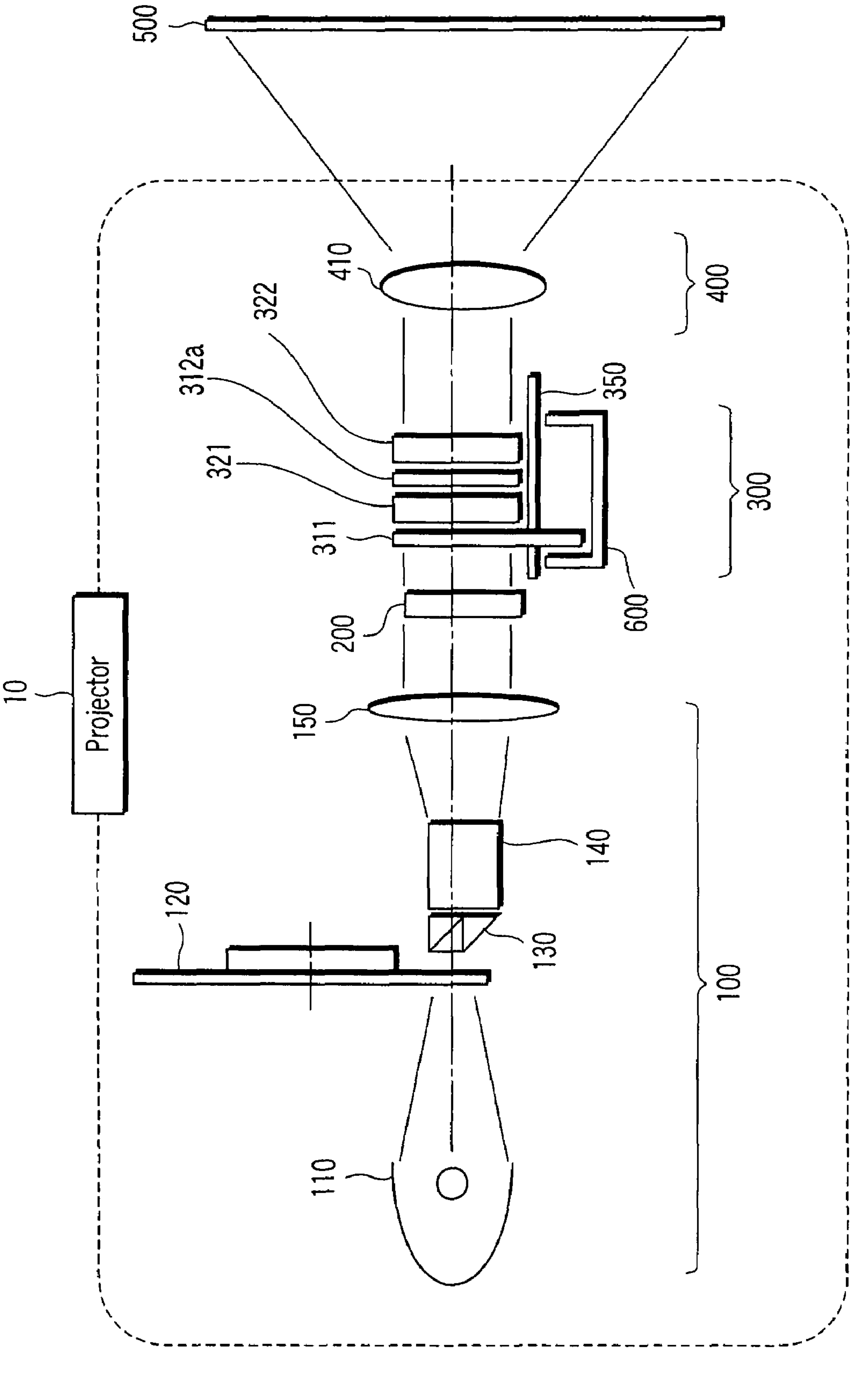
FIG. 22 shows the basic configuration of an image display apparatus having a sensor unit according to a fifth embodiment of the present invention.

FIG. 22 shows the basic configuration of an image display apparatus (image projection apparatus) according to this embodiment.

In this embodiment as well, as with the third embodiment, image display is made on a four-point pixel shift basis. Thus, the pixel shift unit (wobbling unit) 300 is composed of a polarization rotation liquid crystal cell 311, a birefringent plate 321, a polarization rotation liquid crystal cell 312*a*, and a birefringent plate 322. In this embodiment, however, although the polarization rotation liquid crystal cell 311 has display and measurement areas, the polarization rotation liquid crystal cell 312*a* has a display area but not a measurement area. That is, the response characteristic of the polarization rotation liquid crystal cell 311 is measured but no response characteristic of the polarization rotation liquid crystal cell 312*a* is measured. The response characteristic of the polarization rotation liquid crystal cell 312*a* is estimated from that of the polarization rotation liquid crystal cell 311.

Figure 23:
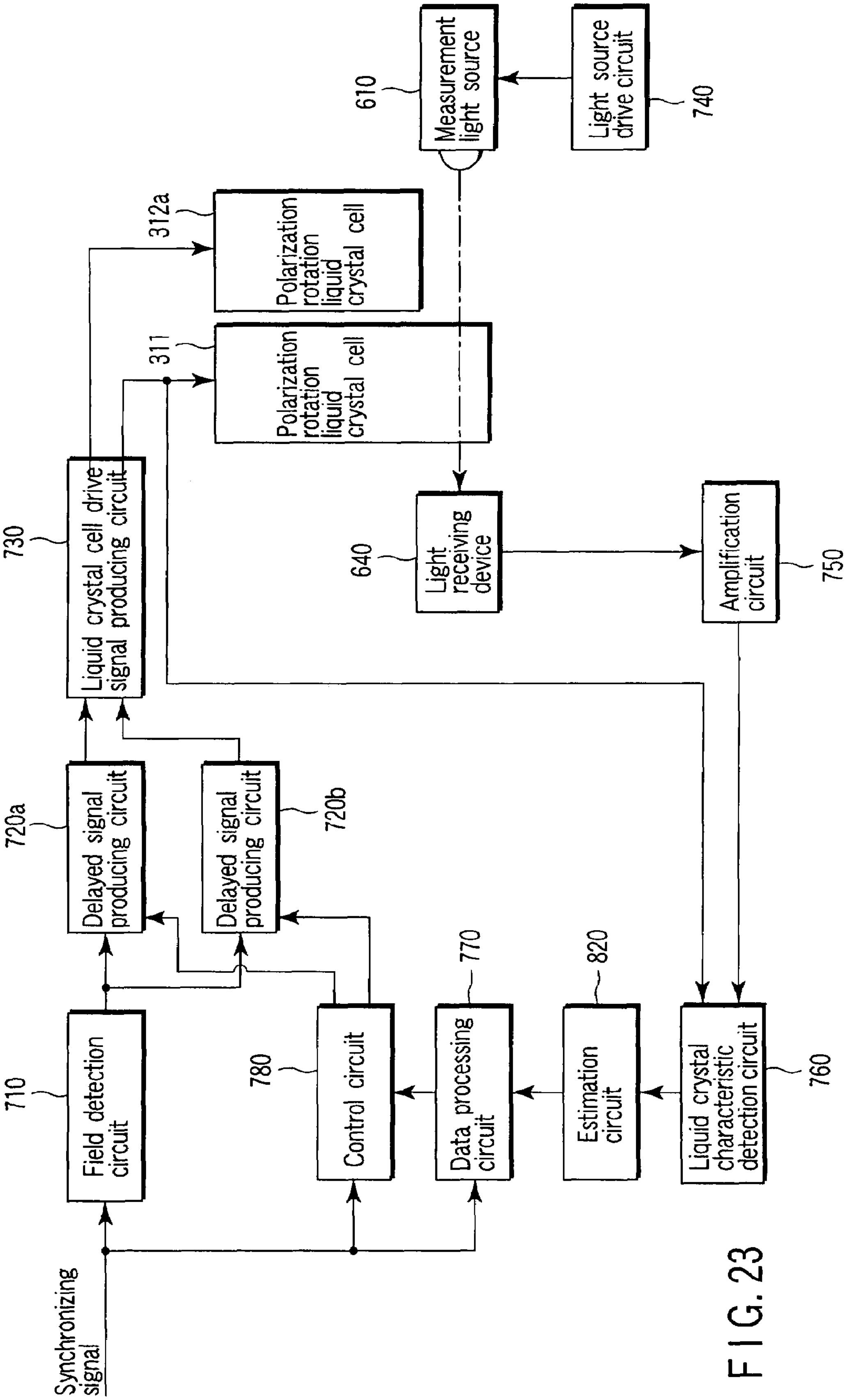
FIG. 23 is a block diagram of the arrangement for drive control of the polarization rotation liquid crystal cell according to the fifth embodiment of the present invention.

FIG. 23 is a block diagram of the configuration for drive control of the polarization rotation liquid crystal cells 311 and 312*a* in this embodiment. The basic configuration remains unchanged from that shown in FIG. 6 in the first embodiment. Thus, the description of matters described in conjunction with FIG. 6 is omitted here.

This embodiment is provided with an estimation circuit 820 to estimate the response characteristic of the polarization rotation liquid crystal cell 312*a* from that of the polarization rotation liquid crystal cell 311. For example, a relationship between the characteristics of the polarization rotation liquid crystal cells 311 and 312*a* is determined in advance. The response characteristic of the polarization rotation liquid crystal cell 312*a* is estimated on the basis of that relationship from the response characteristic of the polarization rotation liquid crystal cell 311. Further, the response characteristic of the polarization rotation liquid crystal cell 312*a* may be estimated assuming it to be identical to that of the polarization rotation liquid crystal cell 311.

A description is given of an example of a method of estimating the response characteristic of the polarization rotation liquid crystal cell 312*a* from that of the polarization rotation liquid crystal cell 311. For example, assume that a beam of light passed through the polarization rotation liquid crystal cell 311 falls on the polarization rotation liquid crystal cell 312*a* while diffusing. In this case, the amount of light passed through the unit area of the polarization rotation liquid crystal cell 312*a* falls below that of the polarization rotation liquid crystal cell 311. As a result, there arises a difference in response characteristic between the polarization rotation liquid crystal cells 311 and 312*a* according to a difference in the amount of light. The estimation circuit 820 is prepared so as to correct such a difference in response characteristic. Thereby, the response characteristic of the polarization rotation liquid crystal cell 312*a* can be estimated properly from the response characteristic of the polarization rotation liquid crystal cell 311.

Figure 24:
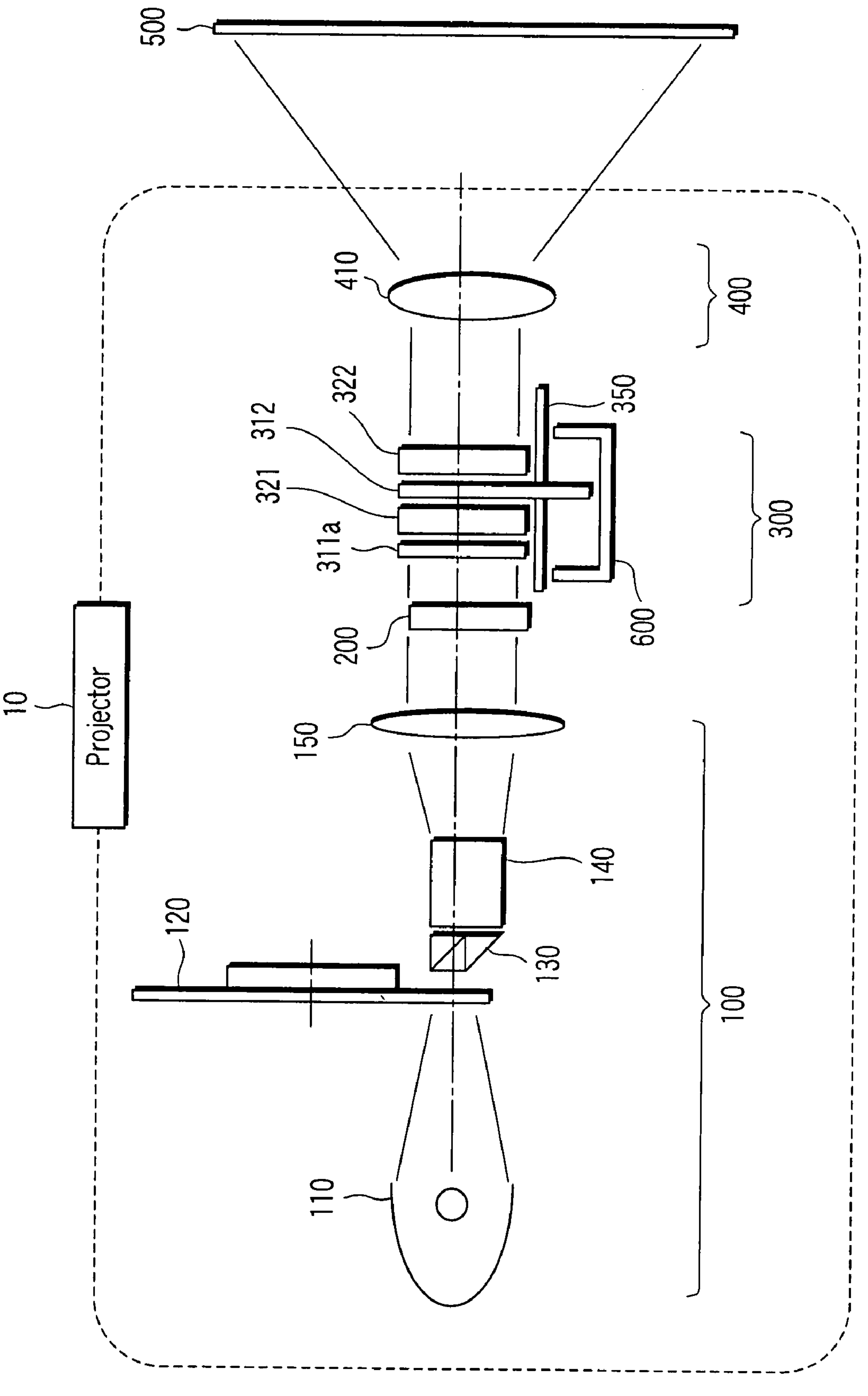
FIG. 24 shows the basic configuration of the image display apparatus having the sensor unit according to the fifth embodiment of the present invention.

The example of FIG. 22 is configured such that the polarization rotation liquid crystal cell 311 on the display unit 200 side has a measurement area, but the polarization rotation liquid crystal cell 312*a* on the screen 500 side has no measurement area. A modification may be made such that, as shown in FIG. 24, the polarization rotation liquid crystal cell 312 on the screen 500 side has a measurement area, but the polarization rotation liquid crystal cell 311*a* on the display unit 200 side has no measurement area. In the case of FIG. 24, the response characteristic of the polarization rotation liquid crystal cell 311*a* is estimated from the response characteristic measured for the polarization rotation liquid crystal cell 312.

With this embodiment, as described above, the response characteristic of one polarization rotation liquid crystal cell is estimated from that of the other polarization rotation liquid crystal cell. Therefore, such problems as described in connection with the comparative example of the third embodiment can be avoided because it is only required to measure the response characteristic of one polarization rotation liquid crystal cell. For this reason, unlike the third embodiment, the response characteristics of the polarization rotation liquid crystal cells 311 and 312 can be obtained without setting the order of display of the pixel positions (A, B, C, D) in a specific one.

Although, in the third through fifth embodiments, two sets of a polarization rotation liquid crystal cell and a birefringent plate are used, use may be made of three or more sets of a polarization rotation liquid crystal cell and a birefringent plate.

According to the present invention, the provision of a sensor unit allows the response characteristic of a polarization rotation liquid crystal cell to be obtained directly and exactly even if it varies with temperature. Accordingly, by adjusting a drive signal of the polarization rotation liquid crystal cell on the basis of the obtained response characteristic, the polarization rotation liquid crystal cell can be driven at all times by the optimized drive signals. As a result, the display quality of the image display apparatus can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image display apparatus which presents an image to an observer, comprising:

an image modulation unit which produces modulated light modulated according to an image signal;

a polarization rotation liquid crystal cell which is capable of rotating a direction of polarization of the modulated light produced by the image modulation unit;

a birefringent plate which receives the modulated light from the polarization rotation liquid crystal cell;

a display optical unit which presents the modulated light from the birefringent plate to the observer;

a sensor unit configured to measure a response characteristic of the polarization rotation liquid crystal cell, the sensor unit including a measurement light source which emits measurement light, a first polarization plate which has a first polarization direction and receives the measurement light from the measurement light source to output measurement light having the first polarization direction to the polarization rotation liquid crystal cell, a second polarization plate which has a second polarization direction and receives measurement light passed through the polarization rotation liquid crystal cell, a light receiving unit which receives measurement light passed through the second polarization plate, and a measurement unit which determines a response characteristic of the polarization rotation liquid crystal cell on the basis of a drive signal of the polarization rotation liquid crystal cell and the amount of measurement light received by the light receiving unit; and a liquid crystal cell drive unit which drives the polarization rotation liquid crystal cell by a drive signal adjusted on the basis of the response characteristic determined by the measurement unit.

2. The image display apparatus according to claim 1, wherein the drive signal is adjusted taking into consideration the amount of light received by the light receiving unit when the polarization rotation liquid crystal cell has been set to a rotating state and the amount of light received by the light receiving unit when the polarization rotation liquid crystal cell has been set to a non-rotating state.

3. The image display apparatus according to claim 2, wherein the drive signal is adjusted so that the ratio or difference between a first amount of light received by the light receiving unit when the polarization rotation liquid crystal cell has been set to the rotating state and a second amount of light received by the light receiving unit when the polarization rotation liquid crystal cell has been set to the non-rotating state increases.

4. The image display apparatus according to claim 1, wherein the modulated light that the birefringent plate receives is separated into available light which arrives a target pixel and unavailable light which arrives a pixel next to the target pixel, and the drive signal is adjusted so that the ratio or difference between the amount of available light and the amount of unavailable light increases.

5. The image display apparatus according to claim 1, wherein an angle between a line that connects a center of the measurement light source and a center of the light receiving unit and a line normal to a light receiving surface of the polarization rotation liquid crystal cell is not more than 5 degrees.

6. The image display apparatus according to claim 1, wherein the sensor unit is placed in an area outside an area through which the modulated light from the image modulation unit passes.

7. The image display apparatus according to claim 1, wherein the image modulation unit is placed on the light receiving unit side of the polarization rotation liquid crystal cell.

8. The image display apparatus according to claim 1, wherein the drive signal is adjusted in real time.

9. The image display apparatus according to claim 1, wherein the measurement unit determines the response characteristic a plurality of times, and the drive signal is adjusted on the basis of a plurality of response characteristics determined.

10. The image display apparatus according to claim 1, wherein the drive signal is adjusted during a blanking period of the image signal.

11. An image display apparatus which presents an image to an observer, comprising:

an image modulation unit which produces modulated light modulated according to an image signal;

a first polarization rotation liquid crystal cell which is capable of rotating a direction of polarization of the modulated light produced by the image modulation unit;

a first birefringent plate which receives the modulated light from the first polarization rotation liquid crystal cell;

a second polarization rotation liquid crystal cell which is capable of rotating a direction of polarization of the modulated light output from the first birefringent plate;

a second birefringent plate which receives the modulated light from the second polarization rotation liquid crystal cell;

a display optical unit which presents the modulated light from the second birefringent plate to the observer;

a sensor unit configured to measure response characteristics of the first and second polarization rotation liquid crystal cells, the sensor unit including a measurement light source which emits measurement light, a first polarization plate which has a first polarization direction and receives the measurement light from the measurement light source to output measurement light having the first polarization direction to the first polarization rotation liquid crystal cell, a second polarization plate which has a second polarization direction and receives measurement light passed through the second polarization rotation liquid crystal cell, a light receiving unit which receives measurement light passed through the second polarization plate, and a measurement unit which determines response characteristics of the first and second polarization rotation liquid crystal cells on the basis of drive signals of the first and second polarization rotation liquid crystal cells and the amount of measurement light received by the light receiving unit; and a liquid crystal cell drive unit which drives the first and second polarization rotation liquid crystal cells by drive signals adjusted on the basis of the response characteristics determined by the measurement unit.

12. The image display apparatus according to claim 11, wherein the liquid crystal cell drive unit drives the first and second polarization rotation liquid crystal cells so that a transition timing of the drive signal of the first polarization rotation liquid crystal cell and a transition timing of the drive signal of the second polarization rotation liquid crystal cell are not coincident with each other.

13. The image display apparatus according to claim 6, wherein the polarization rotation liquid crystal cell has a display area through which the modulated light modulated by the image modulation unit passes and a measurement area through which the measurement light passes, and the liquid crystal cell drive unit drives each of the display area and the measurement area separately.

14. The image display apparatus according to claim 6, wherein the polarization rotation liquid crystal cell has a display area through which the modulated light modulated by the image modulation unit passes and a measurement area through which the measurement light passes, and further comprising a light-tight member between the display area and the measurement area to optically isolate the modulated light and the measurement light.

15. An image display apparatus which presents an image to an observer, comprising:

an image modulation unit which produces modulated light modulated according to an image signal;

a first polarization rotation liquid crystal cell which is capable of rotating a direction of polarization of the modulated light produced by the image modulation unit;

a first birefringent plate which receives the modulated light from the first polarization rotation liquid crystal cell;

a second polarization rotation liquid crystal cell which is capable of rotating a direction of polarization of the modulated light output from the first birefringent plate;

a second birefringent plate which receives the modulated light from the second polarization rotation liquid crystal cell;

a display optical unit which presents the modulated light from the second birefringent plate to the observer;

a sensor unit configured to measure a response characteristic of the first polarization rotation liquid crystal cell, the sensor unit including a measurement light source which emits measurement light, a first polarization plate which has a first polarization direction and receives the measurement light from the measurement light source to output measurement light having the first polarization direction to the first polarization rotation liquid crystal cell, a second polarization plate which has a second polarization direction and receives measurement light passed through the second polarization rotation liquid crystal cell, a light receiving unit which receives measurement light passed through the second polarization plate, and a measurement unit which determines a response characteristic of the first polarization rotation liquid crystal cell on the basis of a drive signal of the first polarization rotation liquid crystal cell and the amount of measurement light received by the light receiving unit; and a liquid crystal cell drive unit which drives the first polarization rotation liquid crystal cell by a drive signal adjusted on the basis of the response characteristic determined by the measurement unit and drives the second polarization rotation liquid crystal cell by a drive signal adjusted on the basis of a response characteristic estimated from the response characteristic determined by the measurement unit.

16. An image display apparatus which presents an image to an observer, comprising:

an image modulation unit which produces modulated light modulated according to an image signal;

a first polarization rotation liquid crystal cell which is capable of rotating a direction of polarization of the modulated light produced by the image modulation unit;

a first birefringent plate which receives the modulated light from the first polarization rotation liquid crystal cell;

a second polarization rotation liquid crystal cell which is capable of rotating a direction of polarization of the modulated light output from the first birefringent plate;

a second birefringent plate which receives the modulated light from the second polarization rotation liquid crystal cell;

a display optical unit which presents the modulated light from the second birefringent plate to the observer;

a sensor unit configured to measure a response characteristic of the second polarization rotation liquid crystal cell, the sensor unit including a measurement light source which emits measurement light, a first polarization plate which has a first polarization direction and receives the measurement light from the measurement light source to output measurement light having the first polarization direction to the first polarization rotation liquid crystal cell, a second polarization plate which has a second polarization direction and receives measurement light passed through the second polarization rotation liquid crystal cell, a light receiving unit which receives measurement light passed through the second polarization plate, and a measurement unit which determines a response characteristic of the second polarization rotation liquid crystal cell on the basis of a drive signal of the second polarization rotation liquid crystal cell and the amount of measurement light received by the light receiving unit; and a liquid crystal cell drive unit which drives the second polarization rotation liquid crystal cell by a drive signal adjusted on the basis of the response characteristic determined by the measurement unit and drives the first polarization rotation liquid crystal cell by a drive signal adjusted on the basis of a response characteristic estimated from the response characteristic determined by the measurement unit.

* * * * *